(12) United States Patent
Kawaguchi

(10) Patent No.: US 6,954,820 B2
(45) Date of Patent: Oct. 11, 2005

(54) BUS BRIDGE INCLUDING FIRST AND SECOND MEMORY AREAS CORRESPONDING TO FIRST AND SECOND BUSES

(75) Inventor: Kenichi Kawaguchi, Kobe (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 328 days.

(21) Appl. No.: 10/261,797

(22) Filed: Sep. 30, 2002

(65) Prior Publication Data
US 2003/0065870 A1 Apr. 3, 2003

(30) Foreign Application Priority Data
Oct. 1, 2001 (JP) ............................. 2001-305676

(51) Int. Cl.⁷ ............................................ G06F 13/36
(52) U.S. Cl. ............. 710/315; 710/310; 710/112; 710/60; 710/39; 710/29
(58) Field of Search ..................... 710/305–307, 710/309–317, 29–39, 5–7, 58–61, 110–112, 118, 125

(56) References Cited

U.S. PATENT DOCUMENTS

| | | | | |
|---|---|---|---|---|
| 5,450,547 A | * | 9/1995 | Nguyen et al. | 713/600 |
| 5,644,787 A | * | 7/1997 | Nakamura et al. | 710/33 |
| 5,826,048 A | * | 10/1998 | Dempsey et al. | 710/306 |
| 6,260,098 B1 | * | 7/2001 | Ku | 710/313 |
| 6,298,407 B1 | | 10/2001 | Davis et al. | |
| 6,636,927 B1 | * | 10/2003 | Peters et al. | 710/309 |
| 6,785,759 B1 | * | 8/2004 | Beukema et al. | 710/310 |
| 6,795,886 B1 | * | 9/2004 | Nguyen | 710/310 |

FOREIGN PATENT DOCUMENTS

| | | |
|---|---|---|
| JP | 05-002557 | 1/1993 |
| JP | 05-173933 | 7/1993 |
| JP | 10-254817 | 9/1998 |

* cited by examiner

*Primary Examiner*—Paul R. Myers
*Assistant Examiner*—Raymond N Phan

(57) ABSTRACT

A bus bridge is connected to a primary bus and a secondary bus, and relays data between a master and a target which are each connected to a different one of the primary and secondary buses. The bus bridge includes a primary bus interface, a secondary bus interface, a data FIFO, and a register block. The register block, which can be written by the master, includes two registers corresponding to the primary and secondary buses. Relay information showing the number of entries of data to be relayed from the target to the master is registered in a register corresponding to a bus to which the target is connected. In a read transaction, the primary bus interface or the secondary bus interface reads data from the target until data of the amount shown by the registered relay information is stored in the data FIFO.

19 Claims, 22 Drawing Sheets

FIG. 5

| ADDRESS | DEVICE/REGISTER |
|---|---|
| 00000000~3FFFFFFF | MEMORY 302 |
| 40000000~5FFFFFFF | BUS TARGET 305 |
| 60000000~7FFFFFFF | BUS TARGET 306 |
| 80000000 | ADDRESS BUFFER 221 |
| 80000004 | REGISTER 231 |
| 8000000C | REGISTER 241 |
| 90000000 | REGISTER 311 |

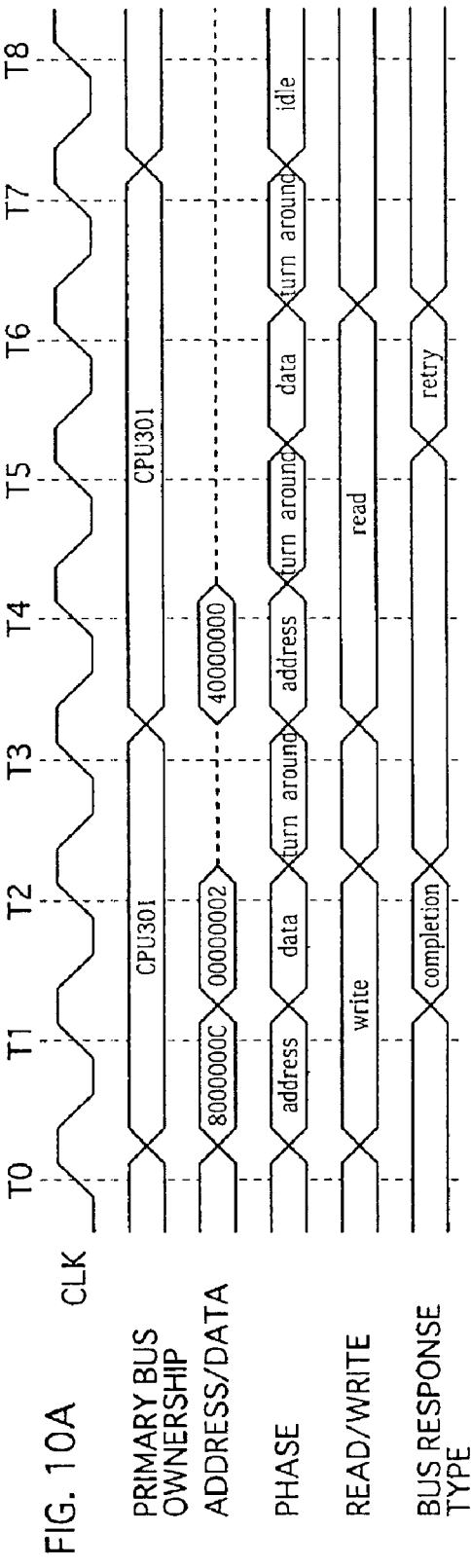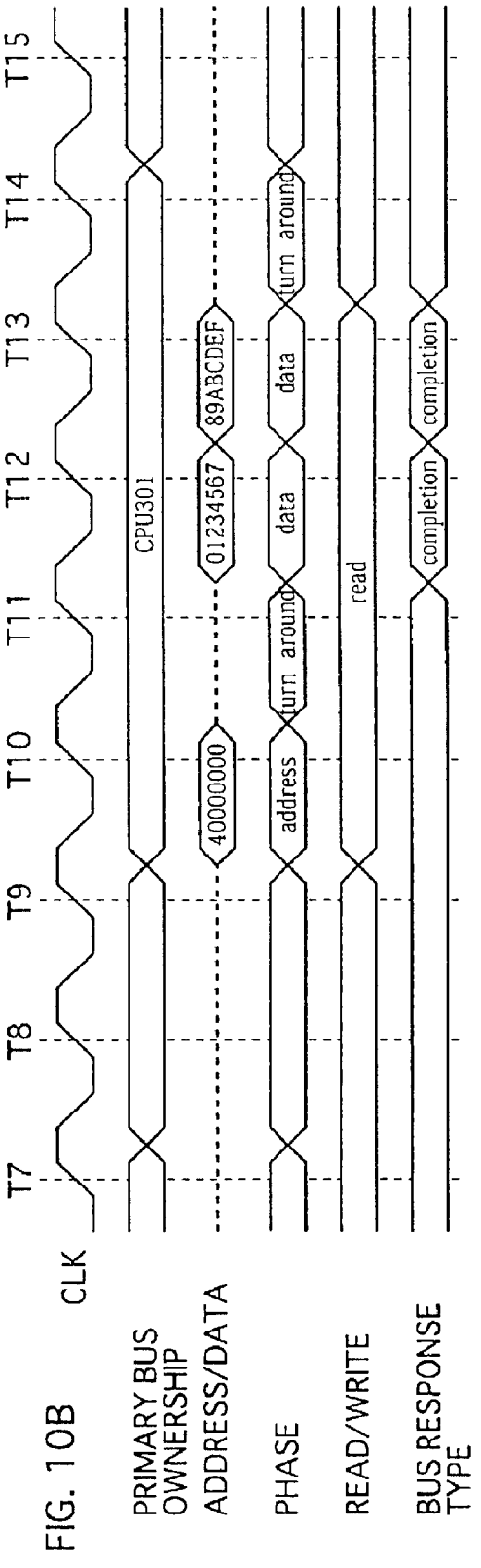

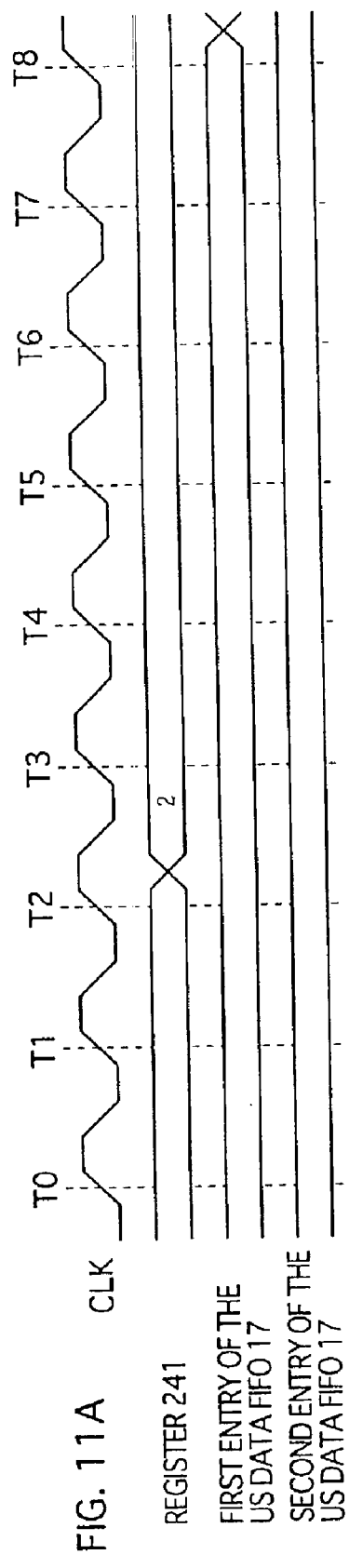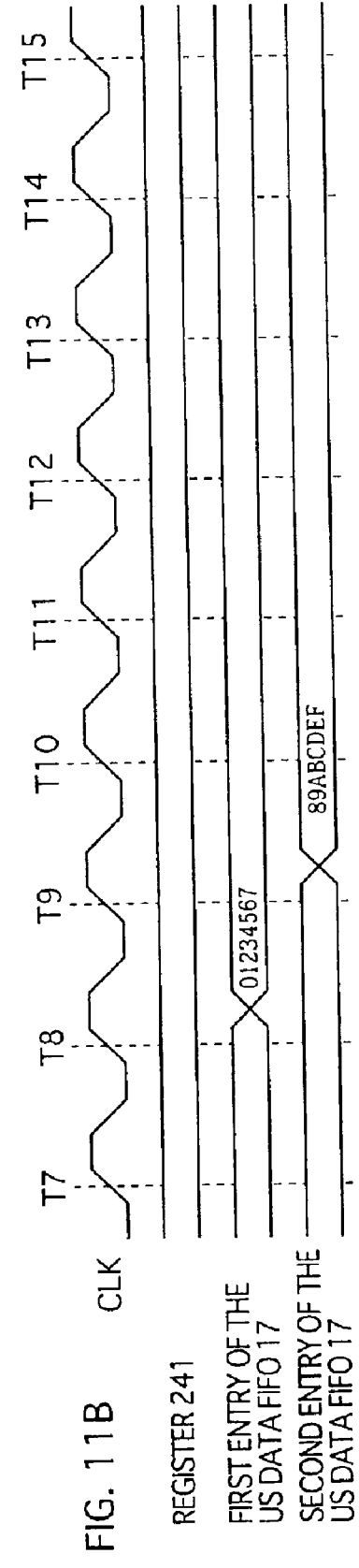

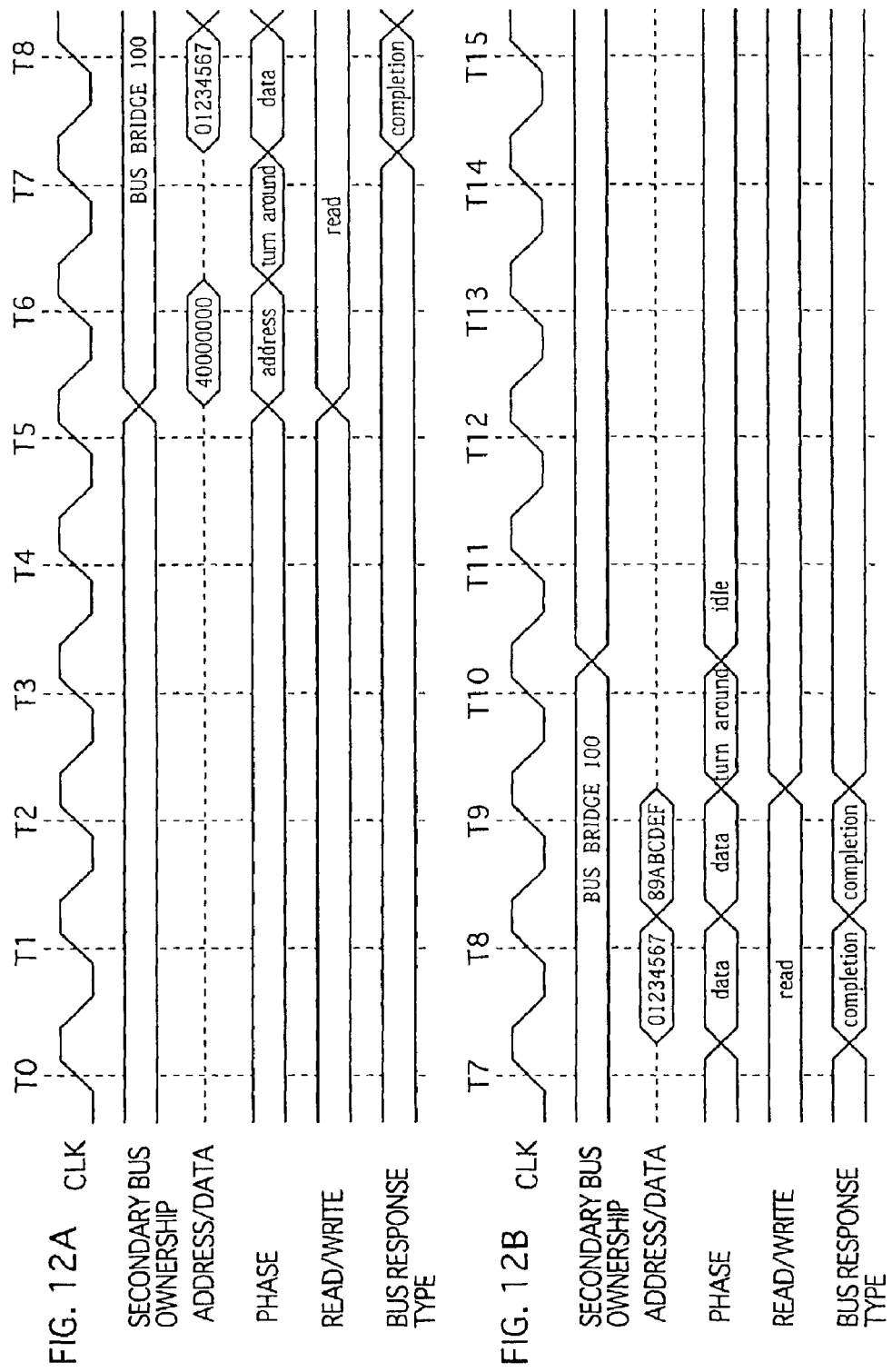

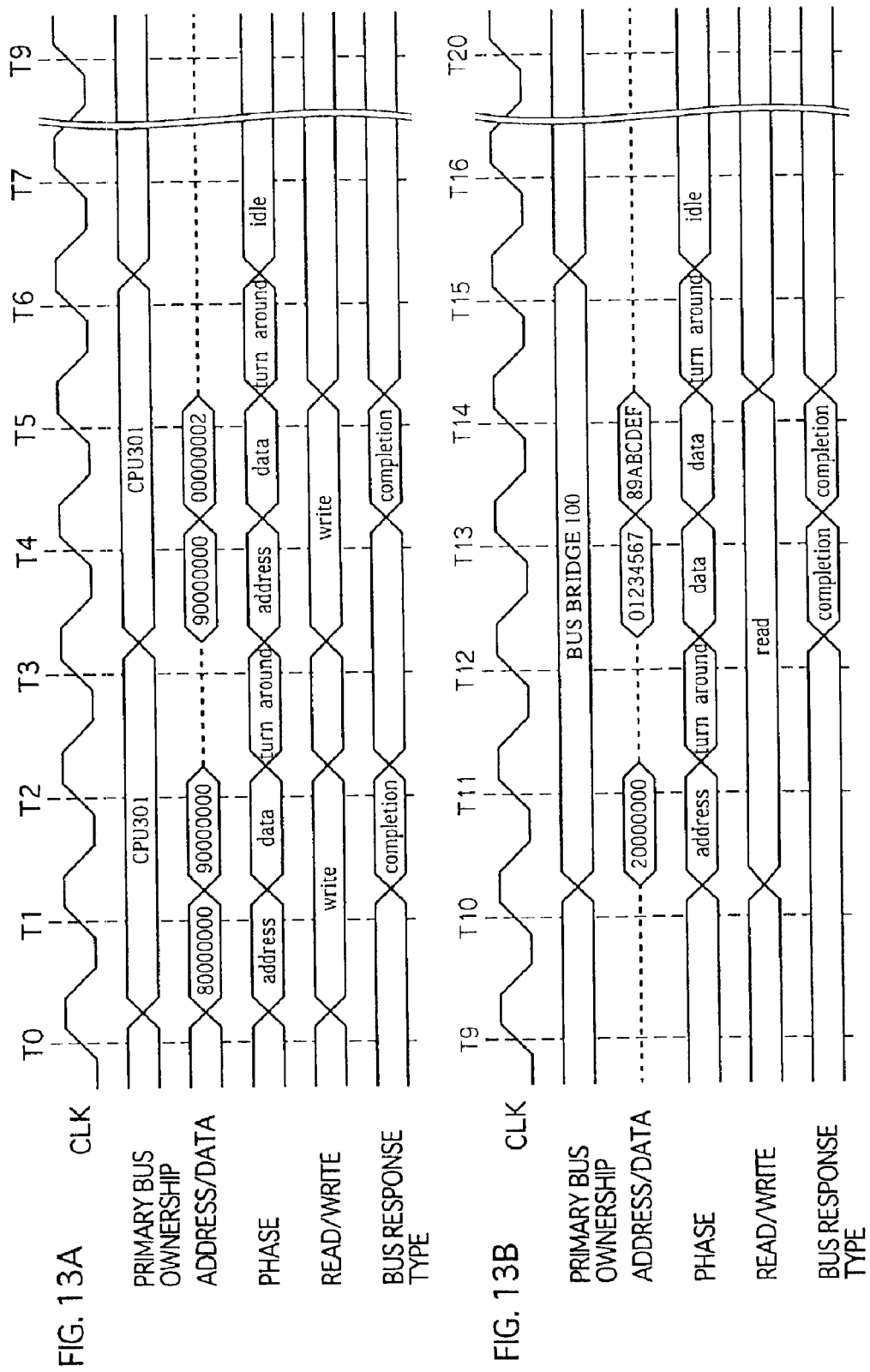

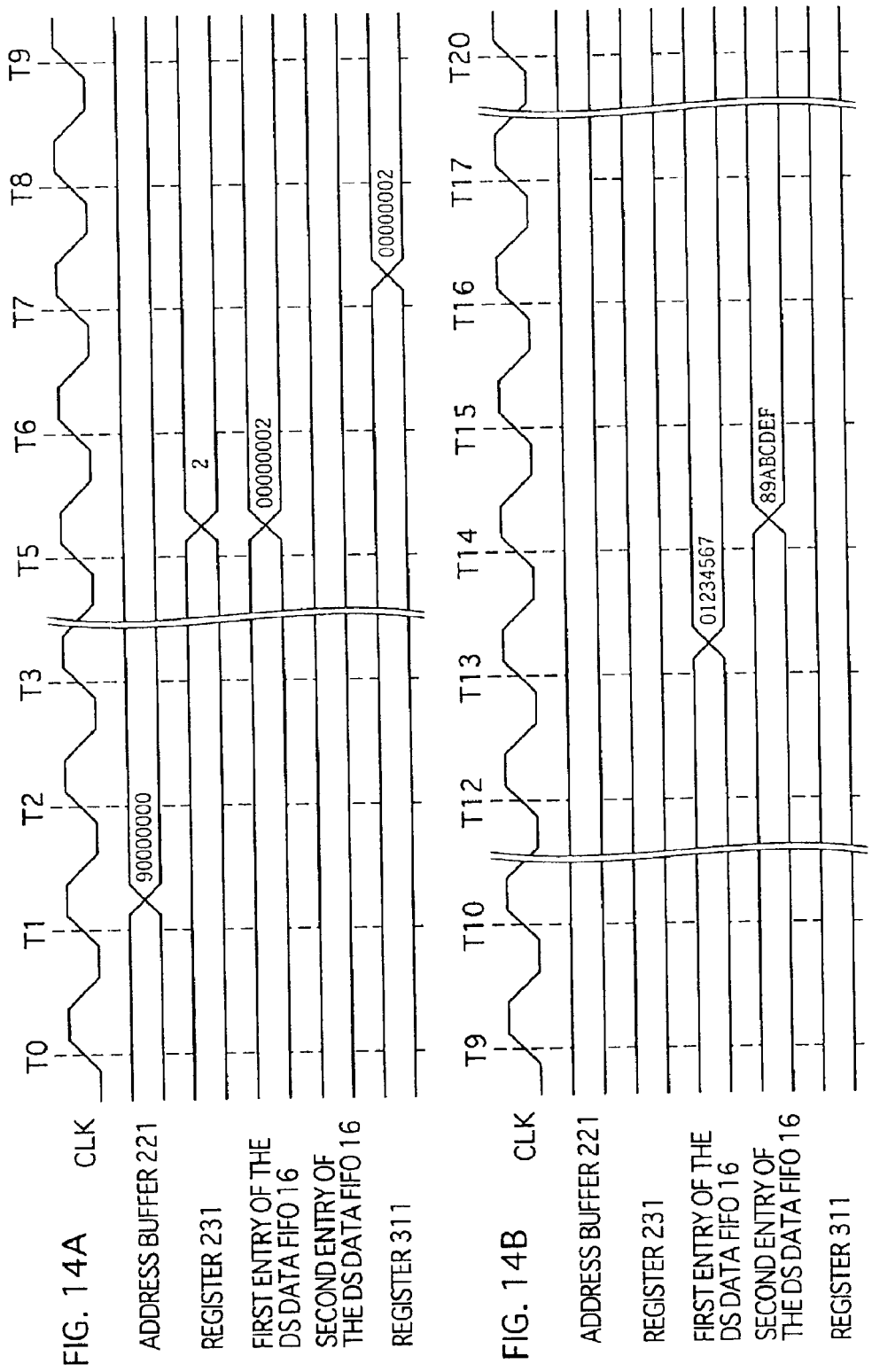

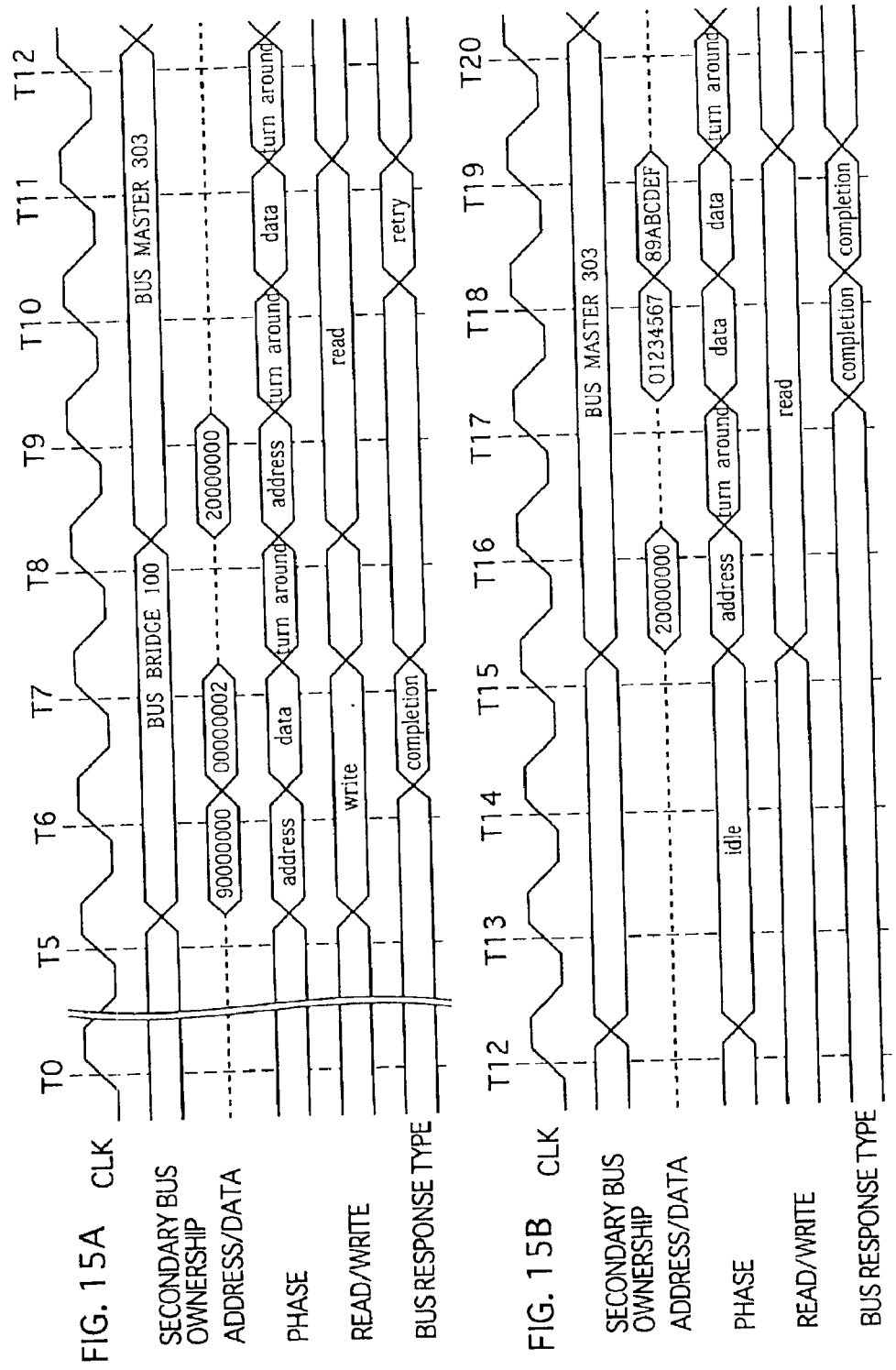

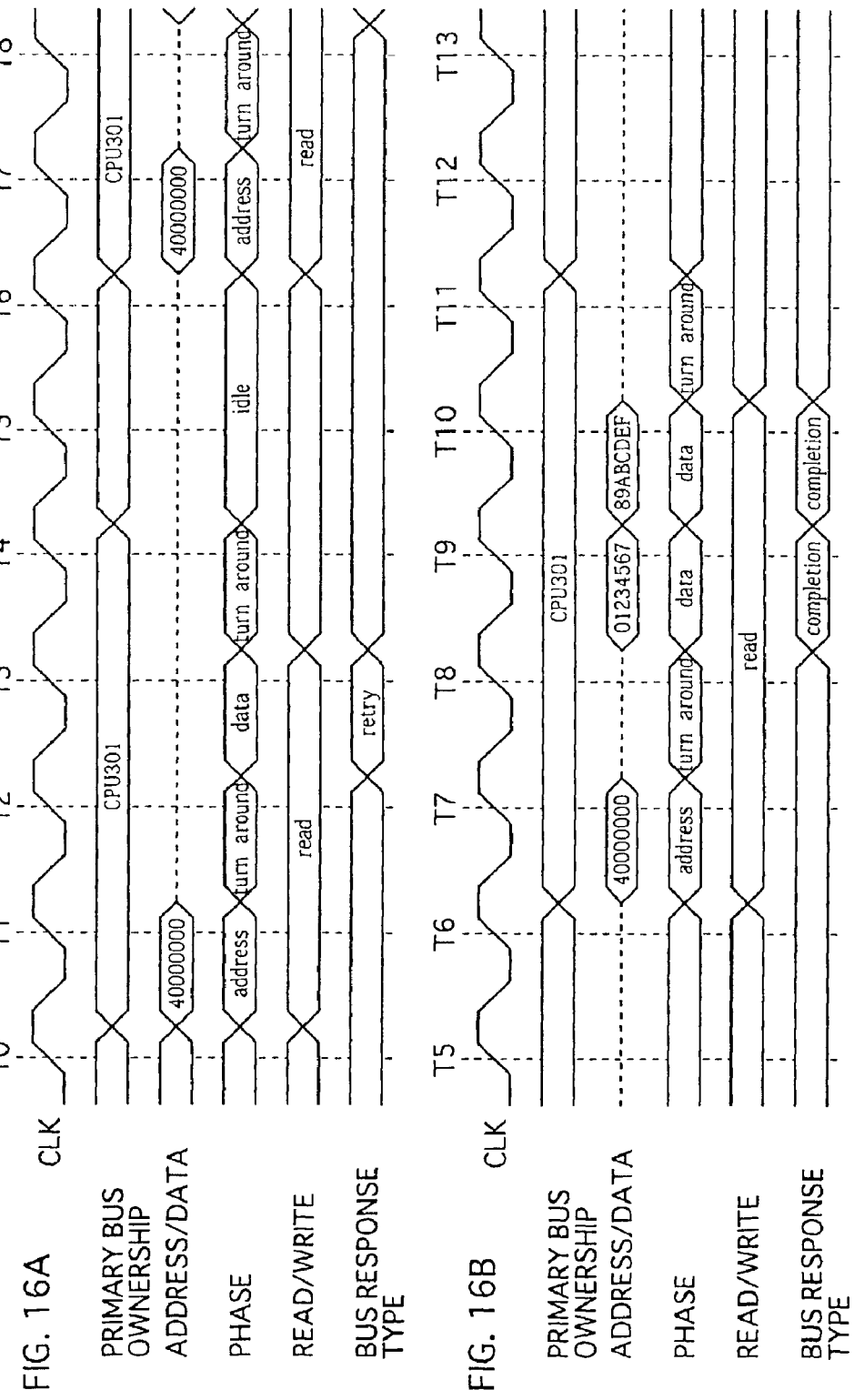

BUS BRIDGE INCLUDING FIRST AND SECOND MEMORY AREAS CORRESPONDING TO FIRST AND SECOND BUSES

This application is based on an application No. 2001-305676 filed in Japan, the contents of which are hereby incorporated by reference.

BACKGROUND OF THE INVENTION

1. Field of the Invention

The present invention relates to a bus bridge for relaying data between devices that are connected to different buses.

2. Related Art

Conventionally, bus bridges are provided between buses in personal computers or computer systems equipped in information apparatuses, to meet the objectives of system expansion and smoothing out discrepancies in bus speed and bus width.

(Construction of a Conventional Bus Bridge)

FIG. 1 is a block diagram showing a conventional bus bridge.

As illustrated, a bus bridge 10 is roughly made up of a primary bus interface 11, a secondary bus interface 12, a bus arbiter 13, a configuration register 14, and a data FIFO (First In, First Out) 15.

The primary bus interface 11 functions as an interface for a primary bus that can transfer data in burst mode, and also controls the data FIFO 15.

The secondary bus interface 12 functions as an interface for a secondary bus that can transfer data in burst mode, and also controls the data FIFO 15.

The primary bus and the secondary bus are, for example, 32-bit address/data multiplexer buses of PCI (Peripheral Component Interconnect).

The bus arbiter 13 arbitrates between the bus bridge 10 and a master of the secondary bus, for ownership of the secondary bus.

Here, a master is also called a "bus master". A bus master is a device that drives address lines of a bus to indicate a device that is the data transfer destination, and sends a bus command to the indicated device. In this specification, a device that alone acts as bus master in a data transfer is referred to as an "initiator".

The configuration register 14 holds configuration information that determines basic operations of the bus bridge 10. The configuration information is based on a format described in the PCI-to-PCI Bridge Architecture Specification and the like.

The data FIFO 15 includes a downstream data FIFO (hereafter a "DS data FIFO") 16 and an upstream data FIFO (hereafter a "US data FIFO") 17.

The DS data FIFO 16 holds an address, a bus command, a byte enable, data, and the like which relate to a bus cycle that is initiated by an initiator of the primary bus to read from or write to a target of the secondary bus. When the bus bridge 10, as an initiator of the secondary bus, initiates a bus cycle to read from or write to the target, this information held in the DS data FIFO 16 is driven onto the secondary bus.

Here, a target is a device that receives an address and a bus command, decodes the received address and bus command, and sends back a response.

The US data FIFO 17 holds an address, a bus command, a byte enable, data, and the like which relate to a bus cycle that is initiated by an initiator of the secondary bus to read from or write to a target of the primary bus. When the bus bridge 10, as an initiator of the primary bus, initiates a bus cycle to read from or write to the target, this information held in the US data FIFO 17 is driven onto the primary bus.

In a read transaction, the bus bridge 10 reads data from a target until a predetermined size of data (e.g. 8 entries) is stored in the data FIFO 15. Note here that addresses, bus commands, and byte enables are not counted as entries.

In this specification, one entry is 4 bytes (32 bits), so that 8 entries are 32 bytes.

Here, the bus bridge 10 may read data which is not required by an initiator.

For instance, when the initiator needs 2 entries of data, the bus bridge 10 reads 8 entries of data from the target, so that the remaining 6 entries will end up being unnecessary.

Reading such unnecessary data from the target causes a problem of prolonging the time during which the bus bridge 10 occupies the bus to which the target is connected.

SUMMARY OF THE INVENTION

In view of the above problem, the present invention has an object of providing a bus bridge that reads only data which is necessary for an initiator, from a target in read transactions. The present invention also has an object of providing a data relay method used by the bus bridge, bus bridge circuit information for configuring a programmable device as the bus bridge, and a programmable logic device readable recording medium which stores the bus bridge circuit information.

The bus bridge of the present invention is a bus bridge that is connected to a first bus and a second bus different from the first bus, and relays data between a first device connected to the first bus and a second device connected to the second bus, including: an externally-writable memory including primary memory areas corresponding to the first and second buses; a registering unit for registering relay information showing an amount of data to be relayed from a target to a master, in a primary memory area corresponding to one of the first and second buses to which the target is connected, the target being one of the first and second devices that is a data source whereas the master being a different one of the first and second devices that is a data destination; a storing unit for storing data read from the target, into a temporary storage; and master functioning units corresponding to the first and second buses, wherein a master functioning unit corresponding to the bus to which the target is connected (a) reads data from the target while occupying the bus, until an amount of data stored in the temporary storage reaches the amount shown by the relay information in the primary memory area, and (b) releases the bus once the amount of data in the temporary storage has reached the amount shown by the relay information.

With this construction, in a read transaction the relay information showing the amount of data required by the master is written to the memory of the bus bridge before the bus bridge reads data from the target. As a result, the bus bridge reads only the data required by the master, from the target. Since the bus bridge does not read data unnecessary for the master, the time during which the bus bridge occupies the bus to which the target is connected is reduced. Furthermore, it becomes unnecessary for the master to write the relay information to the memory each time the bus to which the target is connected changes. In other words, once the relay information has been written, relaying of data can be conducted efficiently. Also, by registering relay information optimized for each bus to a primary memory area corresponding to the bus, data can be relayed more efficiently.

Here, the bus bridge may further include: a responding unit for responding to a request made by the master, wherein when the request made by the master is to write information to the primary memory area, the responding unit has the registering unit register the information in the primary memory area as the relay information, and when the request made by the master is to read data from the target, the responding unit (a) judges whether the data to be relayed is stored in the temporary storage, (b) outputs the data to the master if the data is stored in the temporary storage, and (c) advises the master to remake the request and has the master functioning unit read the data from the target, if the data is not stored in the temporary storage.

With this construction, the master sends the relay information to the bus bridge together with the request to write to the primary memory area, so that the bus bridge can read the amount of data required by the master from the target.

Here, the primary memory area corresponding to the bus to which the target is connected may include secondary memory areas corresponding to devices which are connected to the bus and any of which can be the target, wherein the registering unit registers the relay information in a secondary memory area corresponding to the target, and the master functioning unit reads, from the target, the data of the amount shown by the relay information in the secondary memory area.

With this construction, it becomes unnecessary for the master to write the relay information to the memory each time the target changes. In other words, once the relay information has been written, relaying of data can be conducted efficiently. Also, by registering relay information optimized for each target-candidate device to a secondary memory area corresponding to the device, data can be relayed more efficiently.

Here, the secondary memory area corresponding to the target may include tertiary memory areas corresponding to devices any of which can be the master, wherein the registering unit registers the relay information in a tertiary memory area corresponding to the master, and the master functioning unit reads, from the target, the data of the amount shown by the relay information in the tertiary memory area.

With this construction, it becomes unnecessary to write the relay information to the memory each time the master changes. In other words, once the relay information has been written, relaying of data can be conducted efficiently. Also, by registering relay information optimized for each master-candidate device to a tertiary memory area corresponding to the device, data can be relayed more efficiently.

Here, the registering unit may register a default value in the primary memory area as the relay information, when the bus bridge is in an initial state or when the master functioning unit releases the bus.

With this construction, even when the master does not write relay information, relay information which has been written can be renewed using the default value.

Here, the relay information may show one out of (a) a number of sets of data to be relayed, each set of data having a bit length equivalent to a width of the bus, and (b) a total size of data to be relayed.

With this construction, the amount of data required by the master can be specified as the number of sets of data in the bus width unit or as the total data size.

Here, the first device and the second device may each be given identification information for identifying the device, wherein the externally-writable memory further includes an identification information memory area, the registering unit registers identification information in the identification information memory area, and the responding unit further responds to a request made by a third device which is connected to any of the first and second buses, wherein when the request made by the third device is to write information to the identification information memory area, the responding unit has the registering unit register the information in the identification information memory area as the identification information, and when the request made by the third device is to write information to a device identified by the identification information in the identification information memory area, the responding unit has the registering unit register the information in the primary memory area as the relay information.

With this construction, even if the master is unable to write the relay information to the memory in the bus bridge, a device (e.g. a CPU) other than the master writes the relay information to the memory, so that the bus bridge can read the amount of data required by the master from the target. Also, it is unnecessary for each master-candidate device to separately write its relay information to the memory in the bus bridge. Which is to say, a specific device can manage the relay information of each master-candidate device and write it to the memory in the bus bridge. In this way, relaying of data can be conducted more efficiently.

Here, the first bus may be connected to a central processing unit that can be the master and a storage device that can be the target, and the second bus may be connected to devices any of which can be the master or the target, wherein the primary memory areas include: a first primary memory area for holding relay information showing an amount of data to be read from the target connected to the first bus; and a second primary memory area for holding relay information showing an amount of data to be read from the target connected to the second bus, the temporary storage includes: a first storage area for storing data read from the target connected to the first bus; and a second storage area for storing data read from the target connected to the second bus, the registering unit includes: a first selector, connected to the first primary memory area, for selecting relay information held in the first primary memory area; and a second selector, connected to the second primary memory area, for selecting relay information held in the second primary memory area, the responding unit includes: a bus arbiter for outputting a control signal to the first selector, the control signal instructing to select relay information corresponding to the master connected to the second bus; and an address decoder for outputting a control signal to the second selector, the control signal instructing to select relay information corresponding to the target connected to the second bus, and the master functioning units include: a first master functioning unit for reading data from the target connected to the first bus, until data of an amount shown by the relay information selected by the first selector is stored in the first storage area; and a second master functioning unit for reading data from the target connected to the second bus, until data of an amount shown by the relay information selected by the second selector is stored in the second storage area.

With this construction, when a plurality of sets of relay information are stored in the memory in the bus bridge, a set of relay information that corresponds to the master, the target, or the combination of the master and the target can be selected by means of the bus arbiter and the address decoder. As a result, the bus bridge can read the data required by the master from the target, based on the selected set of relay information.

The data relay method of the present invention is a data relay method used for a bus bridge, a first device, and a second device, the bus bridge being connected to a first bus and a second bus different from the first bus and relaying data between the first device connected to the first bus and the second device connected to the second bus, including: a first step of sending, from a master to the bus bridge, relay information which shows an amount of data to be relayed from a target to the master, the target being one of the first and second devices that is a data source whereas the master being a different one of the first and second devices that is a data destination, the relay information being registered in the bus bridge in correspondence with one of the first and second buses to which the target is connected; a second step of sending, from the master to the bus bridge, a request to read from the target; and a third step of (a) if the data to be relayed is stored in the bus bridge, sending the data from the bus bridge to the master, and (b) if the data to be relayed is not stored in the bus bridge, (1) reading data from the target to the bus bridge while occupying the bus to which the target is connected, until an amount of data stored in the bus bridge reaches the amount shown by the relay information, and (2) releasing the bus once the amount of data stored in the bus bridge has reached the amount shown by the relay information.

With this construction, in a read transaction the relay information showing the amount of data required by the master is written to the memory of the bus bridge before the bus bridge reads data from the target. As a result, the bus bridge reads only the data required by the master, from the target. Since the bus bridge does not read data unnecessary for the master, the time during which the bus bridge occupies the bus to which the target is connected is reduced. Furthermore, it becomes unnecessary for the master to write the relay information to the memory each time the bus to which the target is connected changes. In other words, once the relay information has been written, relaying of data can be conducted efficiently. Also, by registering relay information optimized for each bus to a primary memory area corresponding to the bus, data can be relayed more efficiently.

Also, the data relay method of the present invention is a data relay method used for a bus bridge, a first device, and a second device, the bus bridge being connected to a first bus and a second bus different from the first bus and relaying data between the first device connected to the first bus and the second device connected to the second bus, including: a first step of sending, from a device other than a master to the bus bridge, a request to send supply information to the master, the supply information showing an amount of data to be supplied from a target to the master, the target being one of the first and second devices that is a data source whereas the master being a different one of the first and second devices that is a data destination; a second step of copying the supply information in the bus bridge, and registering the copy in the bus bridge as relay information that shows an amount of data to be relayed from the target to the mater, the relay information being registered in correspondence with a bus to which the target is connected; a third step of sending, from the master to the bus bridge, a request to read from the target; and a fourth step of (a) if the data to be relayed is stored in the bus bridge, sending the data from the bus bridge to the master, and (b) if the data to be relayed is not stored in the bus bridge, (1) reading data from the target to the bus bridge while occupying the bus to which the target is connected, until an amount of data stored in the bus bridge reaches the amount shown by the relay information, and (2) releasing the bus once the amount of data stored in the bus bridge has reached the amount shown by the relay information.

With this construction, even if the master is unable to write the relay information to the memory in the bus bridge, a device (e.g. a CPU) other than the master writes the relay information to the memory, so that the bus bridge can read the amount of data required by the master from the target. Also, it is unnecessary for each master-candidate device to separately write its relay information to the memory in the bus bridge. Which is to say, a specific device can manage the relay information of each master-candidate device and write it to the memory in the bus bridge. In this way, relaying of data can be conducted more efficiently.

The bus bridge circuit information of the present invention is bus bridge circuit information for configuring a programmable logic device as a bus bridge that is connected to a first bus and a second bus different from the first bus and relays data between a first device connected to the first bus and a second device connected to the second bus, the bus bridge circuit information configuring the programmable logic device as the bus bridge that includes: an externally-writable memory including primary memory areas corresponding to the first and second buses; a registering unit for registering relay information showing an amount of data to be relayed from a target to a master, in a primary memory area corresponding to one of the first and second buses to which the target is connected, the target being one of the first and second devices that is a data source whereas the master being a different one of the first and second devices that is a data destination; a storing unit for storing data read from the target, into a temporary storage; and master functioning units corresponding to the first and second buses, wherein a master functioning unit corresponding to the bus to which the target is connected (a) reads data from the target while occupying the bus, until an amount of data stored in the temporary storage reaches the amount shown by the relay information in the primary memory area, and (b) releases the bus once the amount of data in the temporary storage has reached the amount shown by the relay information.

With this construction, the bus bridge circuit information acquired through a recording medium or a network is downloaded to a programmable device on general hardware of a computer or the like via a download cable. This being so, in a read transaction the relay information showing the amount of data required by the master is written to the memory of the programmable device before the programmable device reads data from the target. This enables the programmable device to read only the data required by the master from the target. Since the programmable device does not read data which is unnecessary for the master, the time during which the programmable device occupies the bus to which the target is connected is shortened. Furthermore, it becomes unnecessary for the master to write the relay information to the memory each time the bus to which the target is connected changes. In other words, once the relay information has been written, relaying of data can be conducted efficiently. Also, by registering relay information optimized for each bus to a primary memory area corresponding to the bus, data can be relayed more efficiently.

Here, the bus bridge circuit information may configure the programmable logic device as the bus bridge that further includes: a responding unit for responding to a request made by the master, wherein when the request made by the master is to write information to the primary memory area, the responding unit has the registering unit register the information in the primary memory area as the relay information, and when the request made by the master is to read data from the target, the responding unit (a) judges whether the data to be relayed is stored in the temporary storage, (b) outputs the data to the master if the data is stored in the temporary storage, and (c) advises the master to remake the request and has the master functioning unit read the data from the target, if the data is not stored in the temporary storage.

With this construction, the master sends the relay information to the programmable logic device together with the request to write to the primary memory area, so that the programmable logic device can read the data required by the master from the target.

The recording medium of the present invention is a programmable logic device readable recording medium that stores bus bridge circuit information for configuring a programmable logic device as a bus bridge, the bus bridge being connected to a first bus and a second bus different from the first bus and relaying data between a first device connected to the first bus and a second device connected to the second bus, the bus bridge circuit information configuring the programmable logic device as the bus bridge that includes: an externally-writable memory including primary memory areas corresponding to the first and second buses; a registering unit for registering relay information showing an amount of data to be relayed from a target to a master, in a primary memory area corresponding to one of the first and second buses to which the target is connected, the target being one of the first and second devices that is a data source whereas the master being a different one of the first and second devices that is a data destination; a storing unit for storing data read from the target, into a temporary storage; and master functioning units corresponding to the first and second buses, wherein a master functioning unit corresponding to the bus to which the target is connected (a) reads data from the target while occupying the bus, until an amount of data stored in the temporary storage reaches the amount shown by the relay information in the primary memory area, and (b) releases the bus once the amount of data in the temporary storage has reached the amount shown by the relay information.

With this construction, the bus bridge circuit information acquired through a recording medium is downloaded to a programmable device on general hardware of a computer or the like via a download cable. This being so, in a read transaction the relay information showing the amount of data required by the master is written to the memory of the programmable device before the programmable device reads data from the target. This enables the programmable device to read only the data required by the master from the target. Since the programmable device does not read data which is unnecessary for the master, the time during which the programmable device occupies the bus to which the target is connected is shortened. Furthermore, it becomes unnecessary for the master to write the relay information to the memory each time the bus to which the target is connected changes. In other words, once the relay information has been written, relaying of data can be conducted efficiently. Also, by registering relay information optimized for each bus to a primary memory area corresponding to the bus, data can be relayed more efficiently.

Here, the bus bridge circuit information may configure the programmable logic device as the bus bridge that further includes: a responding unit for responding to a request made by the master, wherein when the request made by the master is to write information to the primary memory area, the responding unit has the registering unit register the information in the primary memory area as the relay information, and when the request made by the master is to read data from the target, the responding unit (a) judges whether the data to be relayed is stored in the temporary storage, (b) outputs the data to the master if the data is stored in the temporary storage, and (c) advises the master to remake the request and has the master functioning unit read the data from the target, if the data is not stored in the temporary storage.

With this construction, the master sends the relay information to the programmable logic device together with the request to write to the primary memory area, so that the programmable logic device can read the data required by the master from the target.

BRIEF DESCRIPTION OF THE DRAWINGS

These and other objects, advantages and features of the invention will become apparent from the following description thereof taken in conjunction with the accompanying drawings which illustrate specific embodiments of the invention.

In the drawings:

FIG. 5 shows an example memory map of addresses which are assigned to devices and registers in the computer system shown in FIG. 4;

FIG. 10A is a timing chart for a primary bus from T0 to T8;

FIG. 10B is a timing chart for the primary bus from T7 to T15;

FIG. 11A is a timing chart for the bus bridge from T0 to T8;

FIG. 11B is a timing chart for the bus bridge from T7 to T15;

FIG. 12A is a timing chart for a secondary bus from T0 to T8;

FIG. 12B is a timing chart for the secondary bus from T7 to T15;

FIG. 13A is a timing chart for the primary bus from T0 to T9;

FIG. 13B is a timing chart for the primary bus from T9 to T20;

FIG. 14A is a timing chart for the bus bridge and a register shown in FIG. 4, from T0 to T9;

FIG. 14B is a timing chart for the bus bridge and the register from T9 to T20;

FIG. 15A is a timing chart for the secondary bus from T0 to T12;

FIG. 15B is a timing chart for the secondary bus from T12 to T20;

FIG. 16A is a timing chart for the primary bus from T0 to T8;

FIG. 16B is a timing chart for the primary bus from T5 to T13;

DESCRIPTION OF THE PREFERRED EMBODIMENTS

First Embodiment

Figure 1:
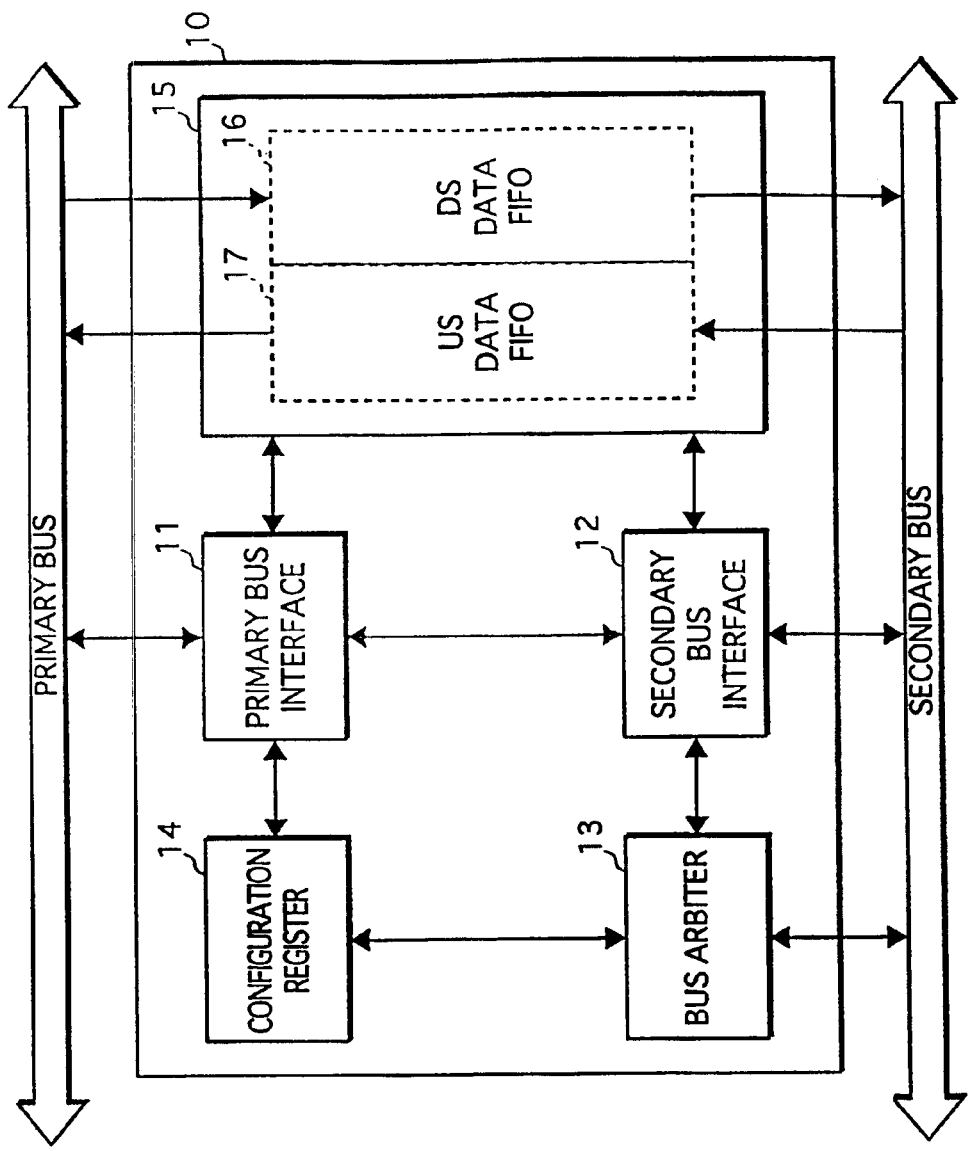
FIG. 1 is a block diagram showing a conventional bus bridge.

Embodiments of the present invention are described with reference to drawings. Note that construction elements which are the same as those in the conventional bus bridge 10 are given the same reference numerals and their explanation has been omitted.

(Construction of a Bus Bridge)

Figure 2:
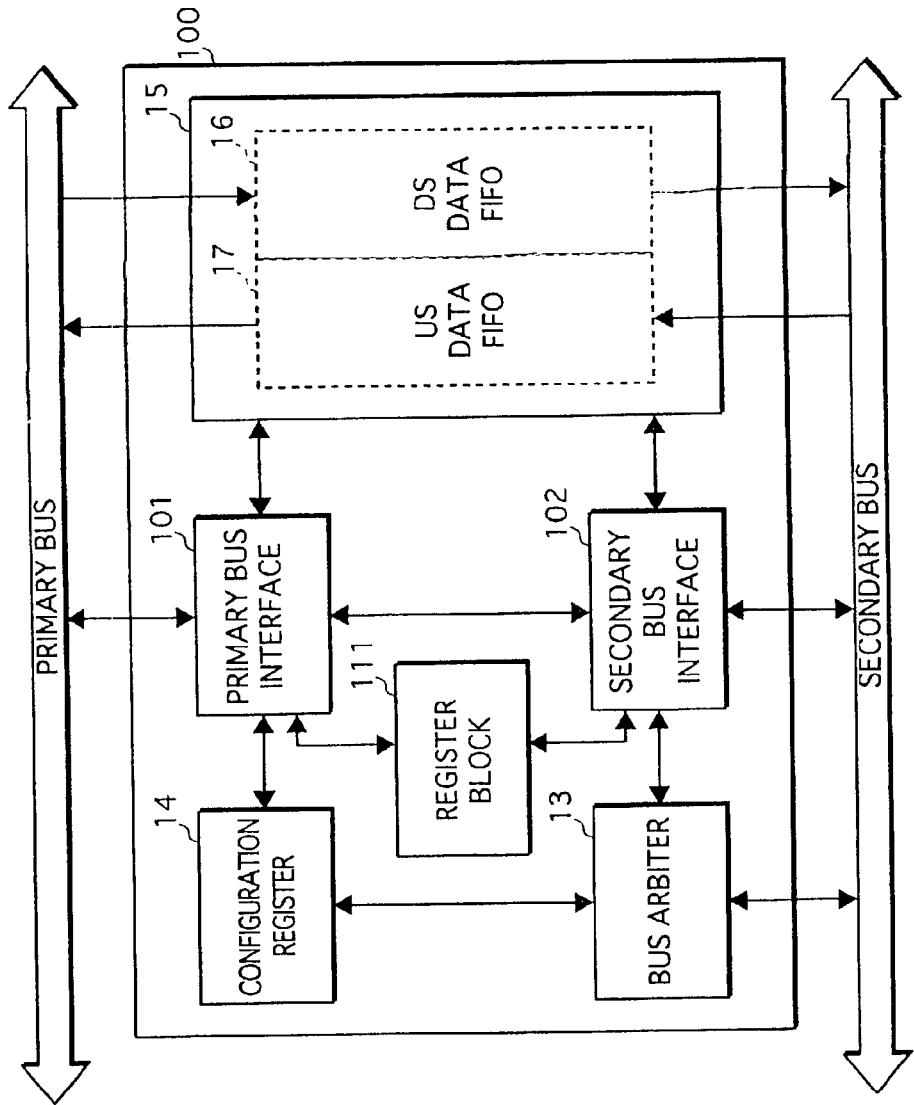
FIG. 2 is a block diagram showing a bus bridge to which the first embodiment of the invention relates.

FIG. 2 is a block diagram showing a bus bridge to which the first embodiment of the present invention relates.

As shown in the drawing, a bus bridge 100 differs with the conventional bus bridge 10 in that a primary bus interface 101 and a secondary bus interface 102 are provided instead of the primary bus interface 11 and the secondary bus interface 12, and a register block 111 is newly included.

The primary bus interface 101 differs with the primary bus interface 11 in that it is connected to the register block 111. When an initiator of the secondary bus initiates a bus cycle to read from a target of the primary bus (hereinafter a bus cycle to read from a device is simply called a "read cycle for the device"), the primary bus interface 101 initiates a read cycle on the primary bus, and controls the read cycle in accordance with relay information held in the register block 111.

Relay information referred to here shows the number of entries of data which should be transferred by the bus bridge 100.

The secondary bus interface 102 differs with the secondary bus interface 12 in that it is connected to the register block 111. When an initiator of the primary bus initiates a read cycle for a target of the secondary bus, the secondary bus interface 102 initiates a read cycle on the secondary bus, and controls the read cycle in accordance with relay information held in the register block 111.

The register block 111 holds relay information.

Figure 3:
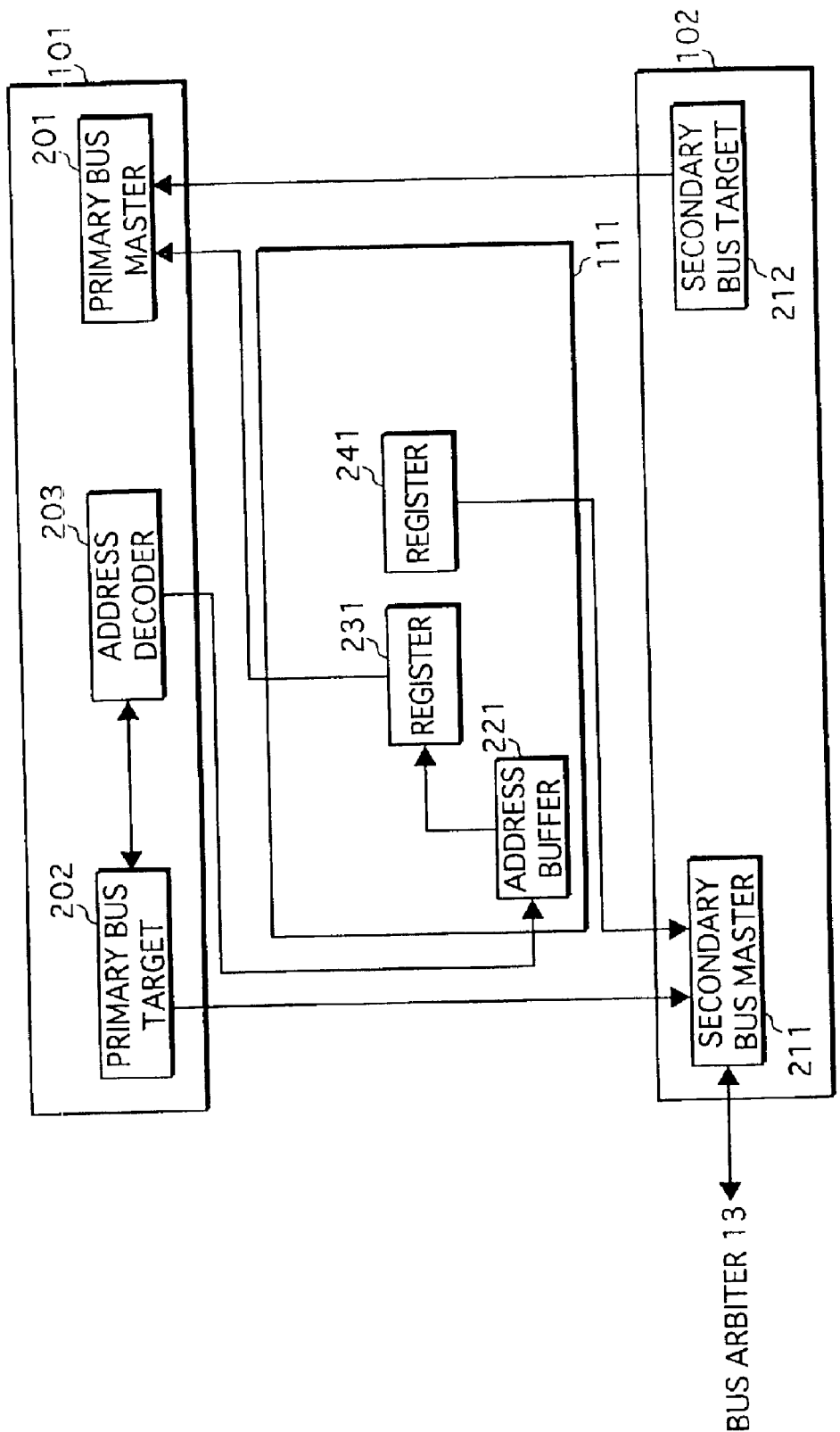
FIG. 3 is a block diagram showing a primary bus interface, a secondary bus interface, and a register block shown in FIG. 2, in greater detail.

FIG. 3 is a detailed block diagram showing the primary bus interface 101, the secondary bus interface 102, and the register block 111.

As illustrated, the primary bus interface 101 includes a primary bus master 201, a primary bus target 202, and an address decoder 203.

The primary bus master 201 acts as a master of the primary bus. To read data from a target of the primary bus, the primary bus master 201 initiates a read cycle on the primary bus, in accordance with relay information in the register block 111.

The primary bus target 202 acts as a target of the primary bus.

The address decoder 203 refers to the configuration register 14, and specifies a device corresponding to an address which is driven during a bus cycle occurring on the primary bus. The address decoder 203 notifies the register block 111 of the address of the specified device.

The secondary bus interface 102 includes a secondary bus master 211 and a secondary bus target 212.

The secondary bus master 211 acts as a master of the secondary bus. To read data from a target of the secondary bus, the secondary bus master 211 initiates a read cycle on the secondary bus, according to relay information in the register block 111.

The secondary bus target 212 acts as a target of the secondary bus.

The register block 111 includes an address buffer 221, a register 231, and a register 241.

The address buffer 221 holds data (an address) which is driven during a bus cycle to write to the address buffer 221, the bus cycle being initiated by an initiator of the primary or secondary bus (hereafter a bus cycle to write to a device is simply called a "write cycle for the device"). The address buffer 221 is connected to the address decoder 203 and the register 231. If the data (address) held in the address buffer 221 matches an address notified by the address decoder 203, the address buffer 221 copies data (relay information) which is driven together with the address notified by the address decoder 203, and writes the copy to the register 231.

The register 231 holds data (relay information) which is driven during a write cycle for the register 231 that is initiated by an initiator of the primary or secondary bus. When an initiator of the secondary bus initiates a read cycle for a target of the primary bus, the register 231 sends the held data (relay information) to the primary bus master 201.

The register 241 holds data (relay information) which is driven during a write cycle for the register 241 that is initiated by an initiator of the primary or secondary bus. When an initiator of the primary bus initiates a read cycle for a target of the secondary bus, the register 241 sends the held data (relay information) to the secondary bus master 211.

(Example Construction of a Computer System Equipped with the Bus Bridge 100)

Figure 4:
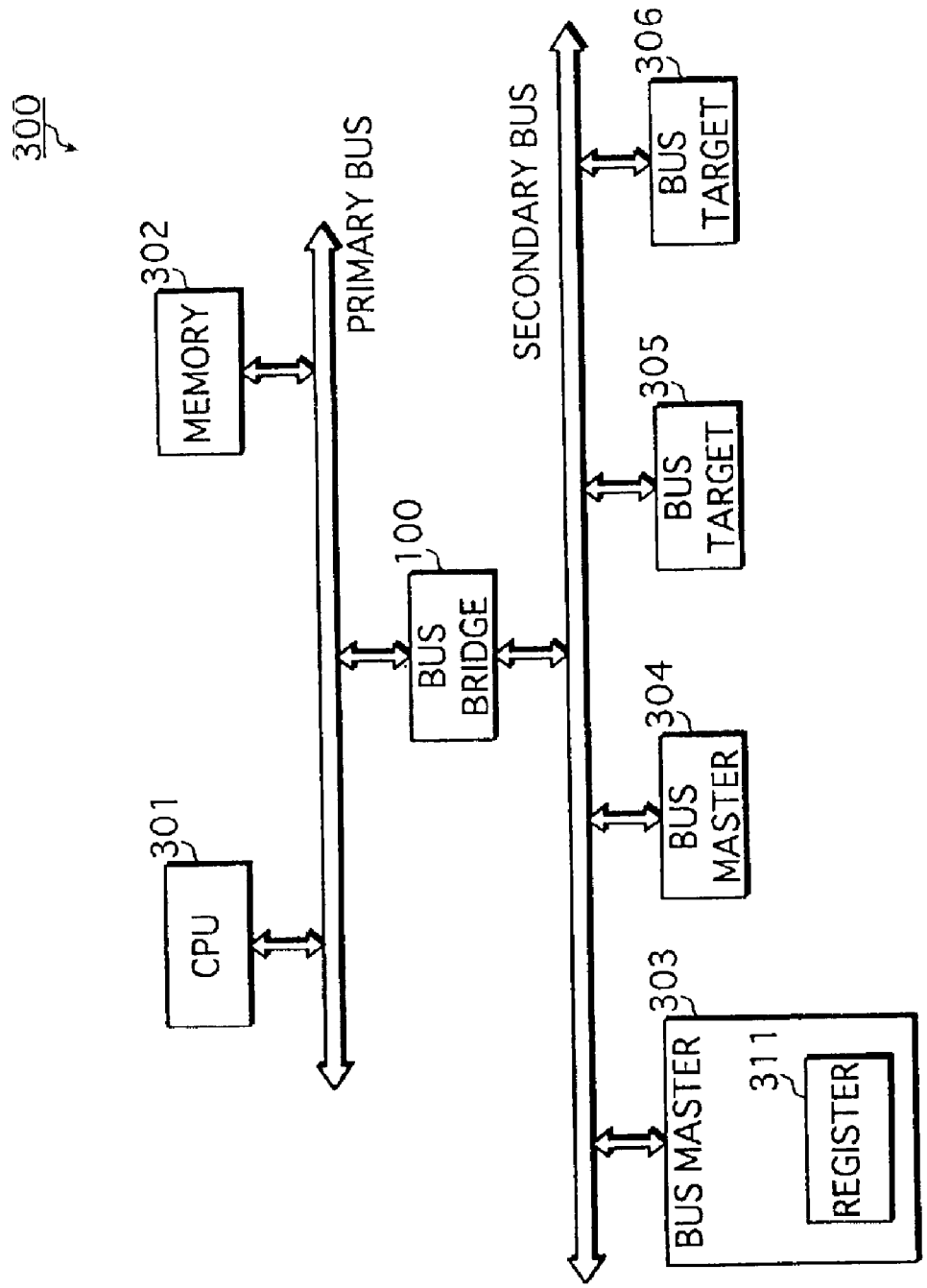
FIG. 4 shows an example construction of a computer system that is equipped with the bus bridge shown in FIG. 2.

FIG. 4 shows an example construction of a computer system that is equipped with the bus bridge 100.

As shown in the drawing, a computer system 300 is roughly made up of a CPU 301, a memory 302, bus masters 303 and 304, bus targets 305 and 306, and the bus bridge 100. The CPU 301 and the memory 302 are connected to the primary bus. The bus masters 303 and 304 and the bus targets 305 and 306 are connected to the secondary bus. The bus bridge 100 is connected to the primary bus and to the secondary bus.

The CPU 301 functions as a master of the primary bus.

The memory 302 functions as a target of the primary bus.

The bus masters 303 and 304 each function as a master of the secondary bus.

The bus master 303 has a register 311. The register 311 stores data (relay information) which is driven during a write cycle for the bus master 303.

The bus targets 305 and 306 each function as a target of the secondary bus.

FIG. 5 is a memory map of addresses which are assigned to the devices and registers in the computer system 300.

A memory map 400 has an address column and a device/register column. A specific address or memory area in a 32-bit memory space is shown in each row of the address column. A device or a register corresponding to an address or memory area is shown in each row of the device/register column. Here, each address is given in units of bytes in hexadecimal representation.

In the computer system 300, addresses 00000000 to 3FFFFFFF are assigned to the memory 302, addresses 40000000 to 5FFFFFFF to the bus target 305, addresses 60000000 to 7FFFFFFF to the bus target 306, address 80000000 to the address buffer 221, address 80000004 to the register 231, address 8000000C to the register 241, and address 90000000 to the register 311.

(Operations of the Bus Bridge 100)

Operations of the bus bridge 100 with the above construction are described next.

(Data Relay Operation in the Bus Bridge 100)

Figure 6:
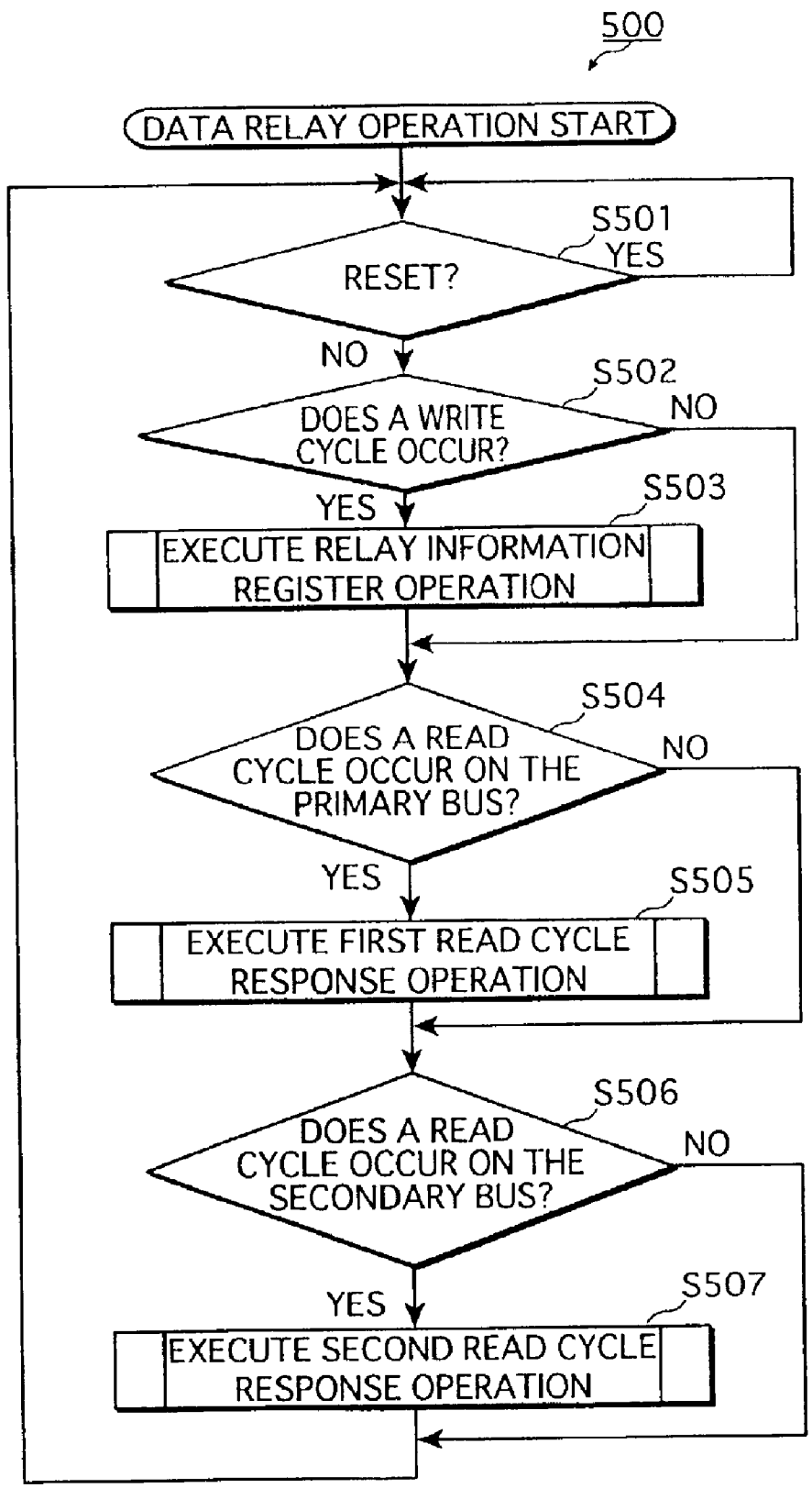
FIG. 6 is a flowchart of a data relay operation in the bus bridge.

FIG. 6 is a flowchart of a data relay operation in the bus bridge 100.

The bus bridge 100 repeats the following steps until it is reset (S501).

The bus bridge 100 judges whether a write cycle occurs on the primary bus (S502).

If a write cycle occurs on the primary bus, the bus bridge 100 executes a relay information register operation (S503).

The bus bridge 100 judges whether a read cycle occurs on the primary bus (S504).

If a read cycle occurs on the primary bus, the bus bridge 100 executes a first read cycle response operation (S505).

The bus bridge 100 judges whether a read cycle occurs on the secondary bus (S506).

If a read cycle occurs on the secondary bus, the bus bridge 100 executes a second read cycle response operation (S507).

(Relay Information Register Operation)

Figure 7:
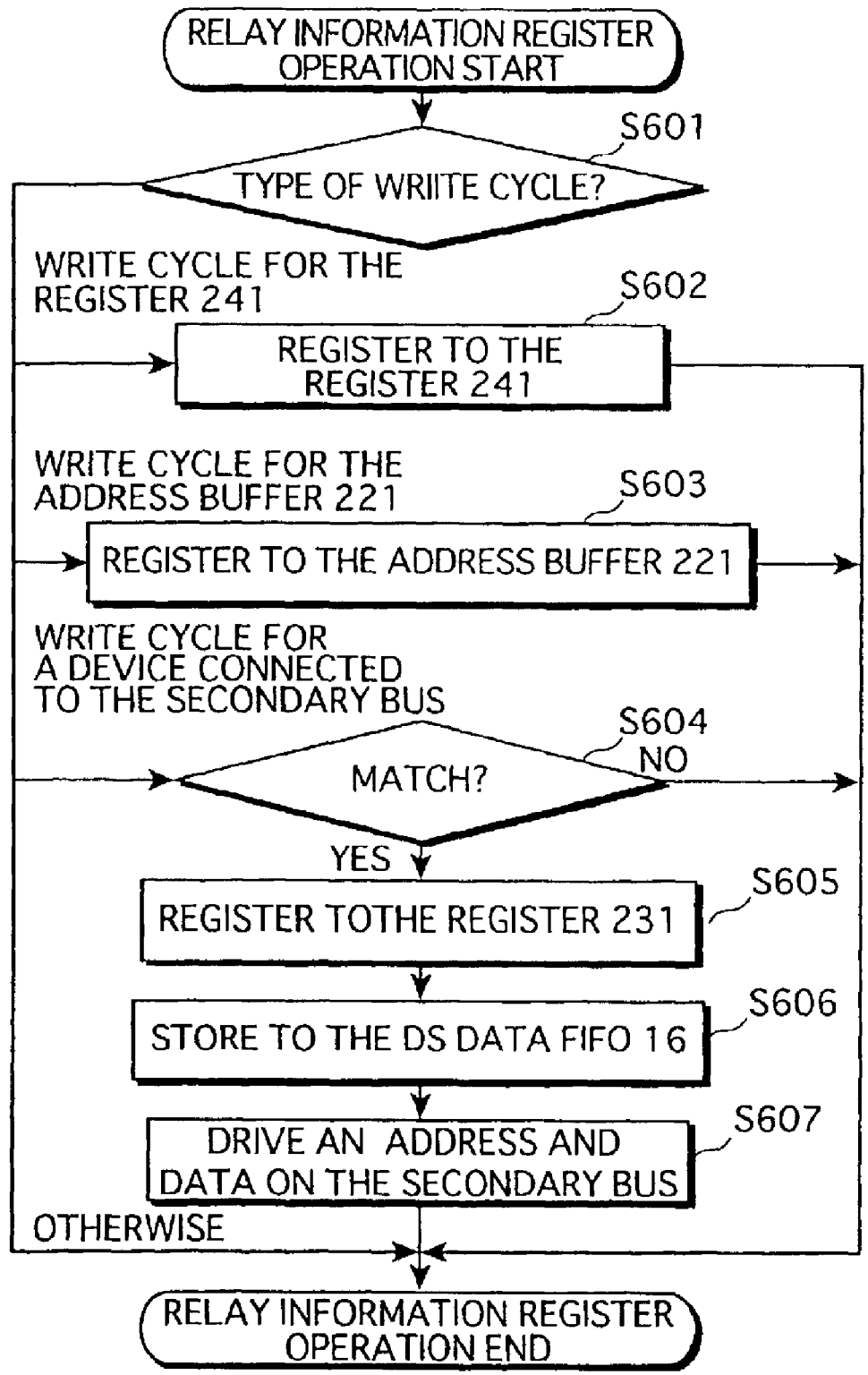
FIG. 7 is a flowchart of a relay information register operation in the bus bridge.

FIG. 7 is a flowchart of the relay information register operation in the bus bridge 100.

The primary bus target 202 judges the type of the write cycle occurring on the primary bus, from an address driven during the write cycle (S601).

If the write cycle is a write cycle for the register 241, the primary bus target 202 registers data (relay information) driven during the write cycle, to the register 241 (S602). This completes the relay information register operation.

If the write cycle is a write cycle for the address buffer 221, the primary bus target 202 registers data (an address) driven during the write cycle, to the address buffer 221 (S603). This completes the relay information register operation.

If the write cycle is a write cycle for a device which is connected to the secondary bus, the address buffer 221 judges whether an address notified by the address decoder 203 matches data (an address) held in the address buffer 221 (S604).

If they match, the address buffer 221 copies data (relay information) driven during the write cycle, and registers the copy to the register 231 (S605). Also, the primary bus target 202 stores the address, a command, a byte enable, and the data (relay information) to the DS data FIFO 16 (S606).

Following this, the secondary bus master 211 initiates a write cycle on the secondary bus, and drives the address and data (relay information) stored in the DS data FIFO 16, onto the secondary bus (S607). This completes the relay information register operation.

(First Read Cycle Response Operation)

Figure 8:
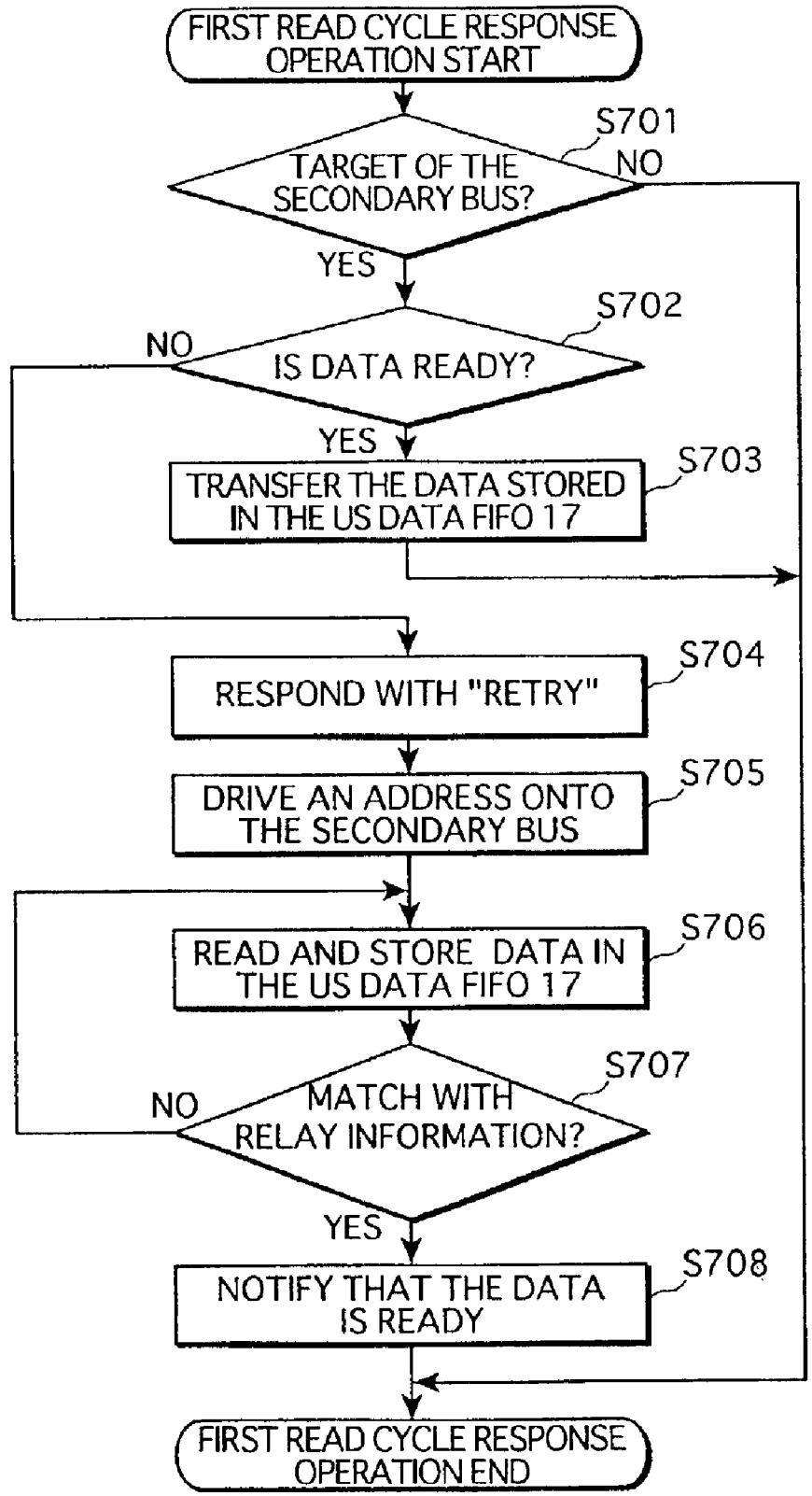
FIG. 8 is a flowchart of a first read cycle response operation in the bus bridge.

FIG. 8 is a flowchart of the first read cycle response operation in the bus bridge 100.

The primary bus target 202 judges whether the read cycle occurring on the primary bus is a read cycle for a target of the secondary bus, from an address driven during the read cycle (S701).

If so, the primary bus target 202 refers to the US data FIFO 17, to judge whether data which is to be transferred to an initiator that initiated the read cycle is ready (S702).

If the data is ready, the primary bus target 202 transfers the data stored in the US data FIFO 17 to the initiator (S703), thereby ending the first read cycle response operation. If the data is not ready, the primary bus target 202 stores the address driven during the read cycle into the DS data FIFO 16, and sends a response "retry" to the initiator that initiated the read cycle (S704).

The secondary bus master 211 receives relay information from the register 241, initiates a read cycle on the secondary bus, and drives the address stored in the DS data FIFO 16, onto the secondary bus (S705).

The secondary bus master 211 then reads data from the target, and stores the read data to the US data FIFO 17 (S706). The secondary bus master 211 judges whether the number of entries of data read from the target matches a number shown by the received relay information (S707).

If they match, the secondary bus master 211 notifies the primary bus target 202 that the data to be transferred to the initiator that initiated the read cycle is ready (S708), thereby ending the first read cycle response operation. If they do not match, the operation returns to step S706.

(Second Read Cycle Response Operation)

Figure 9:
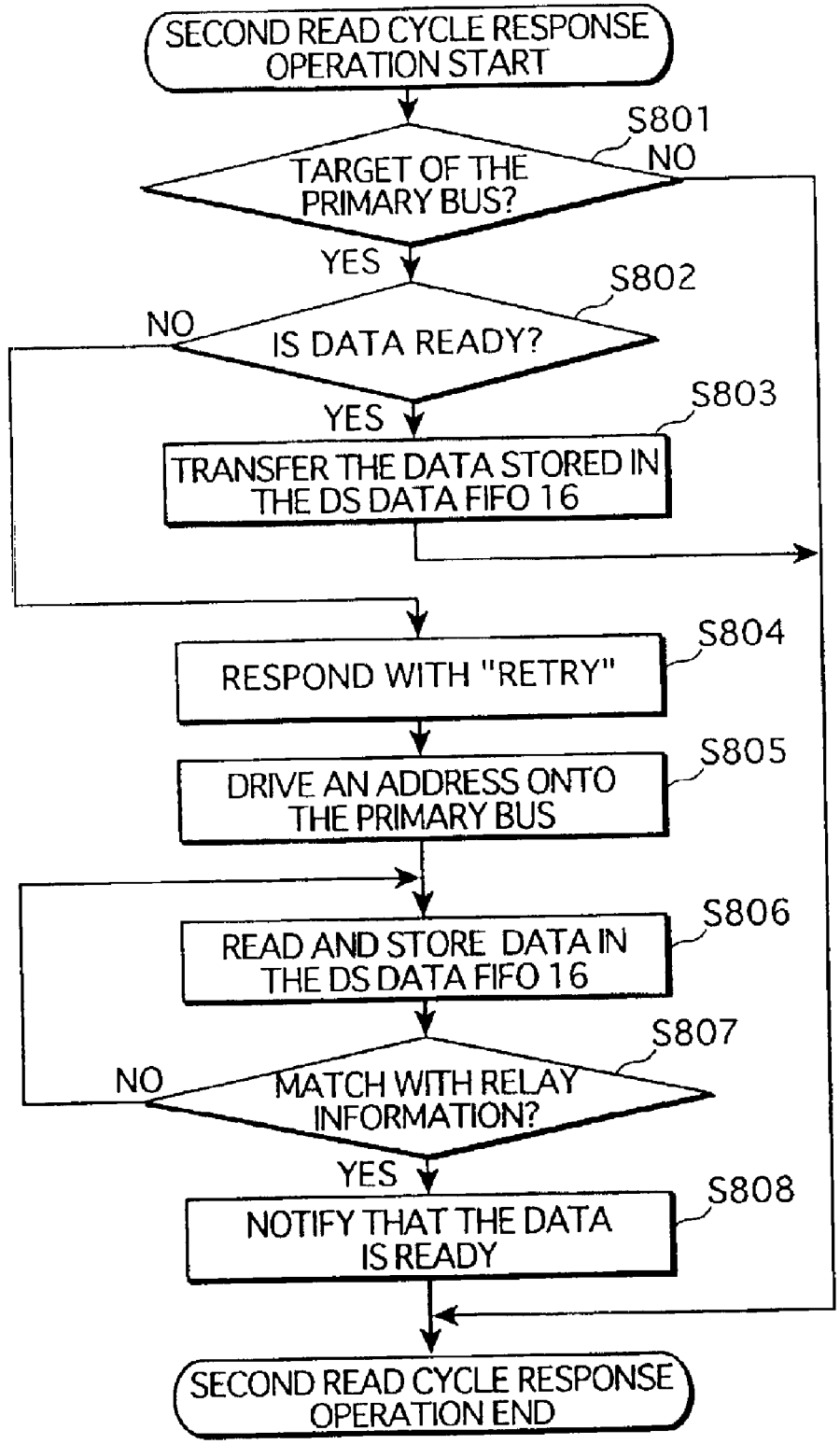
FIG. 9 is a flowchart of a second read cycle response operation in the bus bridge.

FIG. 9 is a flowchart of the second read cycle response operation in the bus bridge 100.

Th secondary bus target 212 judges whether the read cycle occurring on the secondary bus is a read cycle for a target of the primary bus, from an address driven during the read cycle (S801).

If so, the secondary bus target 212 refers to the DS data FIFO 16, to judge whether data to be transferred to an initiator that initiated the read cycle is ready (S802).

If the data is ready, the secondary bus target 212 transfers the data stored in the DS data FIFO 16 to the initiator (S803), thereby ending the second read cycle response operation. If the data is not ready, the secondary bus target 212 stores the address driven during the read cycle into the US data FIFO 17, and sends a response "retry" to the initiator (S804).

The primary bus master 201 receives relay information from the register 231, initiates a read cycle on the primary bus, and drives the address stored in the US data FIFO 17, onto the primary bus (S805).

The primary bus master 201 reads data from the target, stores the read data into the DS data FIFO 16 (S806), and judges whether the number of entries of data read from the target matches a number shown by the received relay information (S807).

If they match, the primary bus master 201 notifies the secondary bus target 212 that the data to be transferred to the initiator that initiated the read cycle is ready (S808), thereby ending the second read cycle response operation. If they do not match, the operation returns to step S806.

This completes an explanation on the flowcharts relating to the data relay operation of the bus bridge 100.

(Operation Examples)

Specific operations of the bus bridge 100 in the computer system 300 are explained by referring to timing charts, taking the following Case 1 and Case 2 as examples.

(Case 1): Data is transferred from a target of the secondary bus to an initiator of the primary bus.

(Case 2) Data is transferred from a target of the primary bus to an initiator of the secondary bus.

A data relay operation of the bus bridge 100 in Case 1 is hereafter called "upstream transfer processing", and a data relay operation in Case 2 a "downstream transfer processing".

(Upstream Transfer Processing)

FIGS. 10–12 are timing charts relating to the upstream transfer processing.

FIG. 10A is a timing chart for the primary bus from T0 to T8, and FIG. 10B is a timing chart for the primary bus from T7 to T15.

As shown in FIGS. 10A and 10B, these timing charts are given in terms of "clock (CLK)", "primary bus ownership", "address/data", "phase", "read/write", and "bus response type".

"Ownership" indicates a device that has a right to use a bus (i.e. a device that is currently an initiator of the bus).

"Address/data" indicates data which is being driven on address/data lines.

"Phase" indicates a phase of a bus cycle, such as "address", "data", "turn around", and "idle".

"Bus response type" indicates the type of a bus response of the bus bridge 100, such as "completion" and "retry".

FIG. 11A is a timing chart for the bus bridge 100 from T0 to T8, and FIG. 11B is a timing chart for the bus bridge 100 from T7 to T15.

As shown in FIGS. 11A and 11B, these timing charts are given in terms of "clock (CLK)", "register 241", "first entry of the US data FIFO 17", and "second entry of the US data FIFO 17".

FIG. 12A is a timing chart for the secondary bus from T0 to T8, and FIG. 12B is a timing chart for the secondary bus from T7 to T15.

As shown in FIGS. 12A and 12B, these timing charts are given in terms of "clock (CLK)", "secondary bus ownership", "address/data", "phase", "read/write", and "bus response type".

Note that the timing charts of FIGS. 10–12 are in synchronization.

First, the CPU 301 asserts the primary bus and initiates a write cycle in T0–T2, as shown in FIG. 10A. The CPU 301 also drives address 8000000C (the address of the register 241) and data 00000002 (relay information) onto the primary bus, which prompts the bus bridge 100 to execute the relay information register operation. The CPU 301 deasserts the primary bus in T1–T2.

Here, "assertion" means that an initiator occupies a bus to initiate a read cycle or a write cycle.

Also, "deassertion" means that the initiator ends the read or write cycle and releases the bus which it has occupied, in the next clock.

In FIG. 11A, the bus bridge 100 registers data 00000002 (relay information) which was driven during the write cycle, to the register 241 in T2–T3.

In more detail, the bus bridge 100 judges that a write cycle for the register 241 occurs in step S601, and executes step S602, thereby ending the relay information register operation.

In FIG. 10A, the CPU 301 asserts the primary bus and initiates a read cycle in T3–T6. The CPU 301 also drives address 40000000 (an address in the bus target 305) onto the primary bus, which prompts the bus bridge 100 to execute the first read cycle response operation. The CPU 301 then receives a retry from the bus bridge 100, as a response to the read cycle. The CPU 301 deasserts the primary bus in T5–T6.

Here, the bus bridge 100 judges that a read cycle for a target of the secondary bus (the bus target 305) occurs in step S701, and executes step S702. The bus bridge 100 then judges that data to be transferred is not ready, and executes step S704.

In FIGS. 12A and 12B, the bus bridge 100 asserts the secondary bus and initiates a read cycle in T5–T9. Also, the bus bridge 100 drives the address (address 40000000) held in the DS data FIFO 16, onto the secondary bus. The bus bridge 100 then reads data 01234567 and 89ABCDEF from the target of the secondary bus (the bus target 305). The bus bridge 100 deasserts the secondary bus in T8–T9.

In FIG. 11B, the bus bridge 100 stores data 01234567 to the first entry of the US data FIFO 17, and data 89ABCDEF to the second entry of the US data FIFO 17.

Here, the bus bridge 100 executes step S705, and repeats step S706 until the number of entries of data read from the target is judged as matching the number shown by the relay information in step S707. The bus bridge 100 then ends the first read cycle response operation.

In FIG. 10B, the CPU 301 asserts the primary bus and reinitiates a read cycle in T9–T13. The CPU 301 also drives address 40000000 (the address in the bus target 305) onto the primary bus, which prompts the bus bridge 100 to re-execute the first read cycle response operation. As a result, the CPU 301 reads data 01234567 and 89ABCDEF from the bus bridge 100 (the first and second entries of the US data FIFO 17). The CPU 301 deasserts the primary bus in T12–T13.

Here, the bus bridge 100 judges that a read cycle for a target of the secondary bus (the bus target 305) occurs in step S701, and executes step S702. The bus bridge 100 then judges that the data to be transferred is ready, and executes step S703, thereby ending the first read cycle response operation.

This completes an explanation on the upstream transfer processing.

(Downstream Transfer Processing)

A specific example of the downstream transfer processing is given next.

FIGS. 13–15 are timing charts relating to the downstream transfer processing.

FIG. 13A is a timing chart for the primary bus from T0 to T9, and FIG. 13B is a timing chart for the primary bus from T9 to T20.

As shown in FIGS. 13A and 13B, these timing charts are given in terms of "clock (CLK)", "primary bus ownership", "address/data", "phase", "read/write", and "bus response type".

FIG. 14A is a timing chart for the bus bridge 100 and the register 311 from T0 to T9, and FIG. 14B is a timing chart for the bus bridge 100 and the register 311 from T9 to T20.

As shown in FIGS. 14A and 14B, these timing charts are given in terms of "clock (CLK)", "address buffer 221", "register 231", "first entry of the DS data FIFO 16", "second entry of the DS data FIFO 16", and "register 311".

FIG. 15A is a timing chart for the secondary bus from T0 to T12, and FIG. 15B is a timing chart for the secondary bus from T12 to T20.

As shown in FIGS. 15A and 15B, these timing charts are given in terms of "clock (CLK)", "secondary bus ownership", "address/data", "phase", "read/write", and "bus response type".

Note that the timing charts of FIGS. 13–15 are in synchronization.

In FIG. 13A, the CPU 301 asserts the primary bus and initiates a write cycle in T0–T2. The CPU 301 also drives address 80000000 (the address of the address buffer 221) and data 90000000 (the address of the register 311) onto the primary bus, which prompts the bus bridge 100 to execute the relay information register operation. The CPU 301 deasserts the primary bus in T1–T2.

In FIG. 14A, the bus bridge 100 registers data 90000000 (the address of the register 311) driven during the write cycle, to the address buffer 221 in T1–T2.

In more detail, the bus bridge 100 judges that a write cycle for the address buffer 221 occurs in step S601, and executes step S603, thereby ending the relay information register operation.

In FIG. 13A, the CPU 301 asserts the primary bus and initiates a write cycle in T3–T5. The CPU 301 also drives address 90000000 (the address of the register 311) and data 00000002 (relay information) onto the primary bus, which prompts the bus bridge 100 to execute the relay information register operation. The CPU 301 deasserts the primary bus in T4–T5.

In FIG. 14A, the bus bridge 100 stores data 00000002 (the relay information) driven during the write cycle, into the DS data FIFO 16 in T5–T6. The bus bridge 100 also copies data 00000002 (the relay information) driven during the write cycle, and stores the copy to the register 231.

In more detail, the bus bridge 100 judges that a write cycle for a device connected to the secondary bus occurs in step S601, and executes step S604. The bus bridge 100 then judges a match, and executes steps S605 and S606.

In FIG. 15A, the bus bridge 100 asserts the secondary bus and initiates a write cycle in T5–T7. The bus bridge 100 also drives address 90000000 (the address of the register 311) and data 00000002 (the relay information) onto the secondary bus. The bus bridge 100 deasserts the secondary bus in T6–T7.

In FIG. 14A, the bus master 303 stores data 00000002 (the relay information) driven on the secondary bus during the write cycle, to the register 311 in T7–T8.

Here, the bus bridge 100 executes step S607, thereby ending the relay information register operation.

In FIG. 15A, the bus master 303 asserts the secondary bus and initiates a read cycle in T8–T11. The bus master 303 also drives address 20000000 (an address of the memory 302) onto the secondary bus, which prompts the bus bridge 100 to execute the second read cycle response operation. The bus master 303 receives a retry from the bus bridge 100, as a response to the read cycle. The bus master 303 deasserts the secondary bus in T10–T11.

In more detail, the bus bridge 100 judges that a read cycle for a target of the primary bus (the memory 302) occurs in step S801, and executes step S802. The bus bridge 100 judges that data to be transferred is not ready, and executes step S804.

In FIG. 13B, the bus bridge 100 asserts the primary bus and initiates a read cycle in T10–T14. The bus bridge 100 also drives address 20000000 (the address of the memory 302) stored in the US data FIFO 17, onto the primary bus. The bus bridge 100 then reads data 01234567 and 89ABCDEF from the target of the primary bus (the memory 302). The bus bridge 100 deasserts the primary bus in T13–T14.

In FIG. 14B, the bus bridge 100 stores data 01234567 to the first entry of the DS data FIFO 16, and data 89ABCDEF to the second entry of the DS data FIFO 16.

Here, the bus bridge 100 executes step S805, and repeats step S806 until the number of entries of data read from the target is judged as matching the number shown by the relay information in step S807. The bus bridge 100 then ends the second read cycle response operation.

In FIG. 15B, the bus master 303 asserts the secondary bus and reinitiates a read cycle in T15–T19. The bus master 303 also drives address 20000000 (the address of the memory 302) onto the secondary bus, which prompts the bus bridge 100 to re-execute the second read cycle response operation. As a result, the bus master 303 reads data 01234567 and 89ABCDEF from the bus bridge 100 (the first and second entries of the DS data FIFO 16). The bus master 303 deasserts the secondary bus in T18–T19.

In more detail, the bus bridge 100 judges that a read cycle for a target of the primary bus (the memory 302) occurs in step S801, and executes step S802. The bus bridge 100 judges that the data to be transferred is ready, and executes step S803, thereby ending the second read cycle response operation.

This completes an explanation on the downstream transfer processing.

(Comparison with the Conventional Bus Bridge 10)

The following gives a comparison between the conventional bus bridge 10 and the bus bridge 100 of this embodiment.

As one example, timing charts where the bus bridge 100 in the computer system 300 is replaced with the bus bridge 10 are used in the following explanation.

FIGS. 16–17 are timing charts relating to upstream transfer processing of the conventional bus bridge 10.

FIG. 16A is a timing chart for the primary bus from T0 to T8, and FIG. 16B is a timing chart for the primary bus from T5 to T13.

As shown in FIGS. 16A and 16B, these timing charts are given in terms of "clock (CLK)", "primary bus ownership", "address/data", "phase", "read/write", and "bus response type".

Figure 17A:
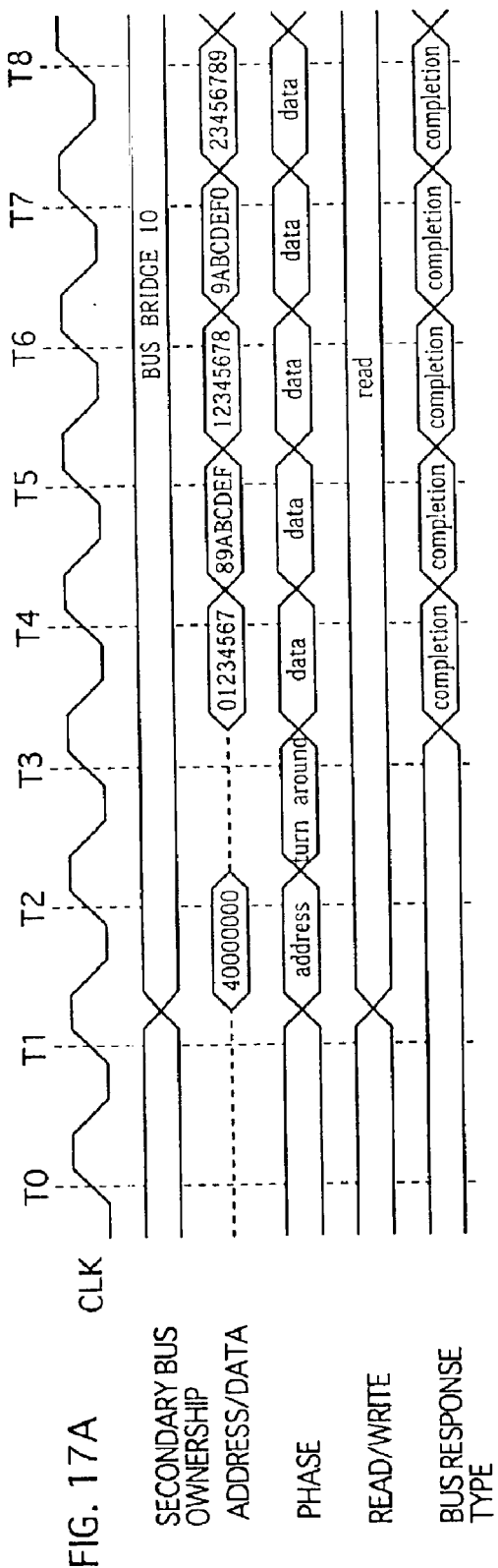
FIG. 17A is a timing chart for the secondary bus from T0 to T8.
Figure 17B:
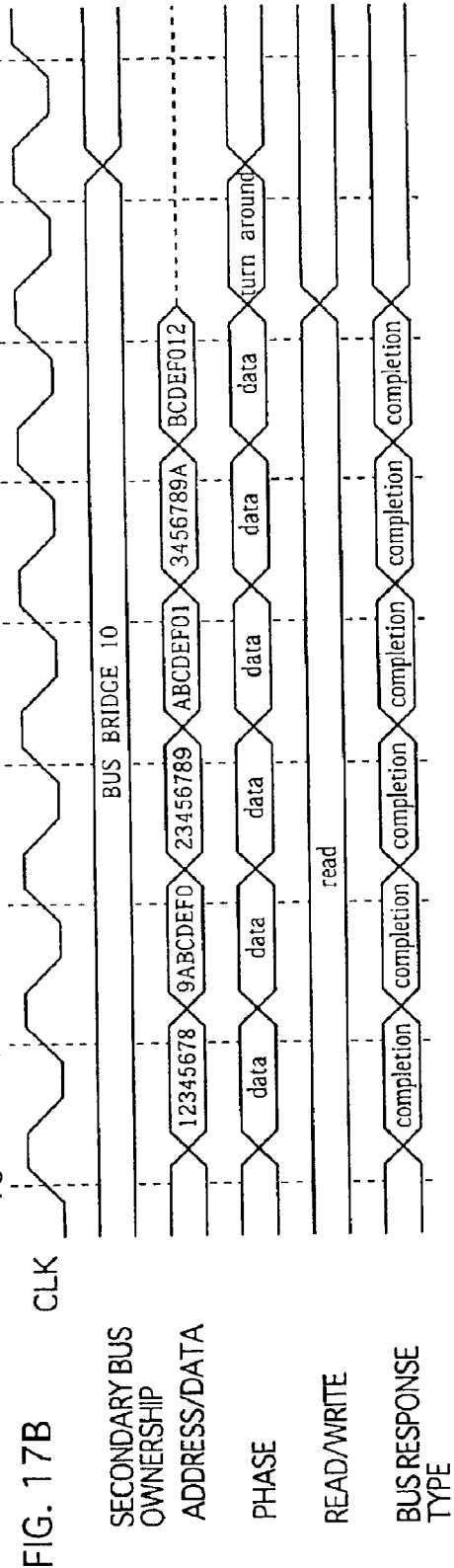
FIG. 17B is a timing chart for the secondary bus form T5 to T13.

FIG. 17A is a timing chart for the secondary bus from T0 to T8, and FIG. 17B is a timing chart for the secondary bus from T5 to T13.

As shown in FIGS. 17A and 17B, these timing charts are given in terms of "clock (CLK)", "secondary bus ownership", "address/data", "phase", "read/write", and "bus response type".

Note that the timing charts of FIGS. 16–17 are in synchronization.

In FIG. 16A, the CPU 301 asserts the primary bus and initiates a read cycle in T0–T3. The CPU 301 also drives address 40000000 (an address of the bus target 305) onto the primary bus. Accordingly, the bus bridge 10 stores the address, a bus command, a byte enable, and the like into the DS data FIFO 16. The CPU 301 receives a retry from the bus bridge 10 as a response to the read cycle. The CPU 301 deasserts the primary bus in T2–T3.

Here, the bus bridge 10 refers to the US data FIFO 17 and judges that data to be transferred is not ready. Hence the bus bridge 10 outputs the retry as the response to the read cycle.

In FIGS. 17A and 17B, the bus bridge 10 asserts the secondary bus and initiates a read cycle in T1–T11. The bus bridge 10 also drives address 40000000 (the address in the bus target 305) stored in the DS data FIFO 16, onto the secondary bus. The bus bridge 10 then reads data 01234567, 89ABCDEF, 12345678, 9ABCDEF0, 23456789, ABCDEF01, 3456789A, and BCDEF012 in sequence, and stores the read data into the US data FIFO 17. The bus bridge 10 deasserts the secondary bus in T10–T11.

In FIG. 16B, the CPU 301 asserts the primary bus and reinitiates a read cycle in T6–T10. The CPU 301 also drives address 40000000 (the address of the bus target 305) onto the primary bus. The CPU 301 then reads data 01234567 and 89ABCDEF from the bus bridge 10. The CPU 301 deasserts the primary bus in T9–T10.

When comparing the bus bridge 10 with the bus bridge 100, the bus bridge 10 reads 8 entries of data from the target even when only 2 entries of data need to be transferred to the CPU 301, as shown in FIGS. 16 and 17. On the other hand, the bus bridge 100 reads only the 2 entries of data which need to be transferred to the CPU 301, as shown in FIGS. 10–12. This demonstrates that the bus bridge 100 occupies the bus to which the target is connected, for a shorter time period than the bus bridge 10.

Second Embodiment

The following describes the second embodiment of the present invention with reference to drawings. Note that construction elements and operation steps which are the same as those in the first embodiment are given the same reference numerals and their explanation has been omitted.

Figure 18:
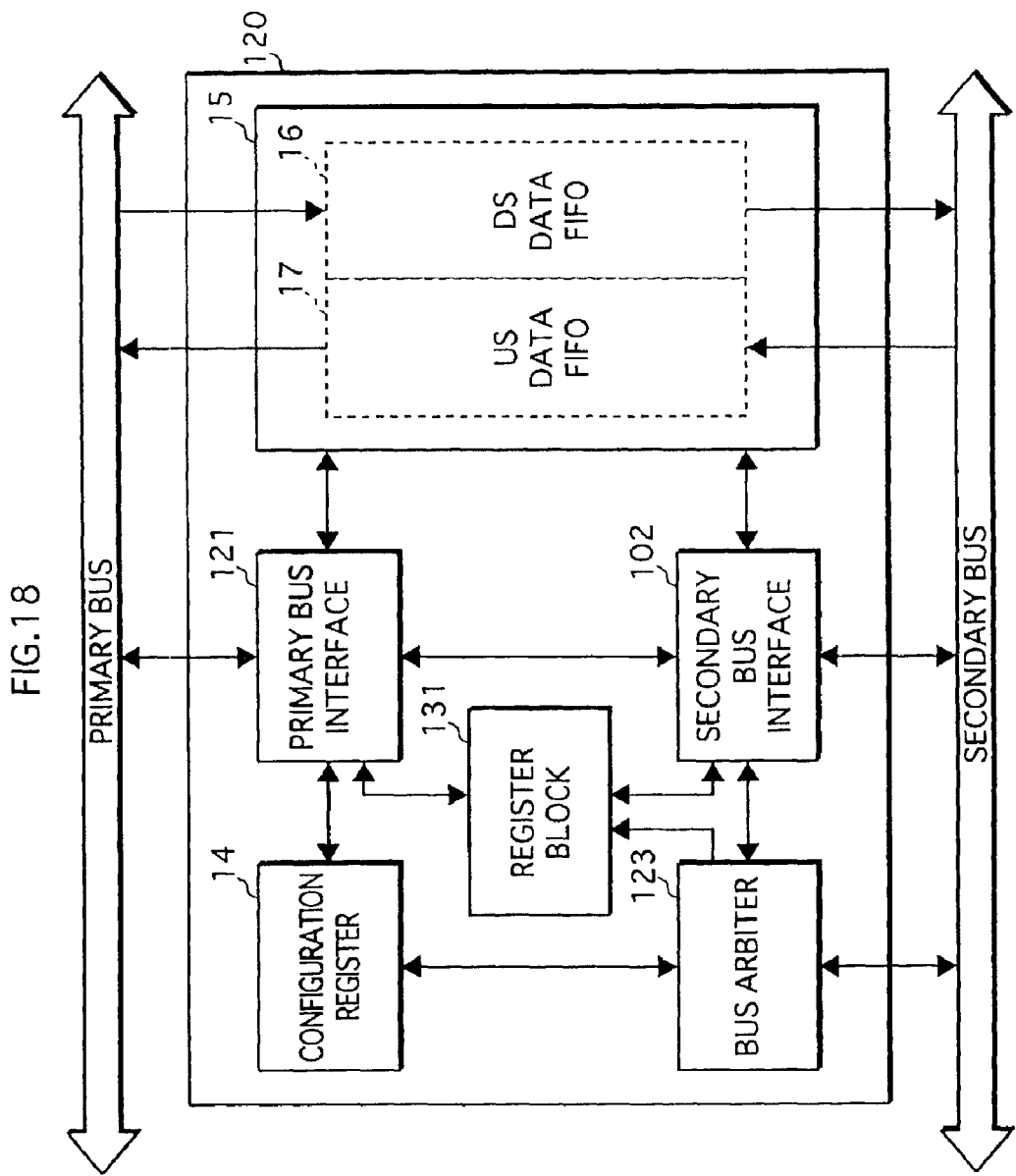
FIG. 18 is a block diagram showing a bus bridge to which the second embodiment of the invention relates.

FIG. 18 is a block diagram showing a bus bridge to which the second embodiment of the invention relates.

As shown in the drawing, a bus bridge 120 differs with the bus bridge 100 of the first embodiment in that the primary bus interface 101, the bus arbiter 13, and the register block 111 are replaced with a primary bus interface 121, a bus arbiter 123, and a register block 131.

Figure 19:
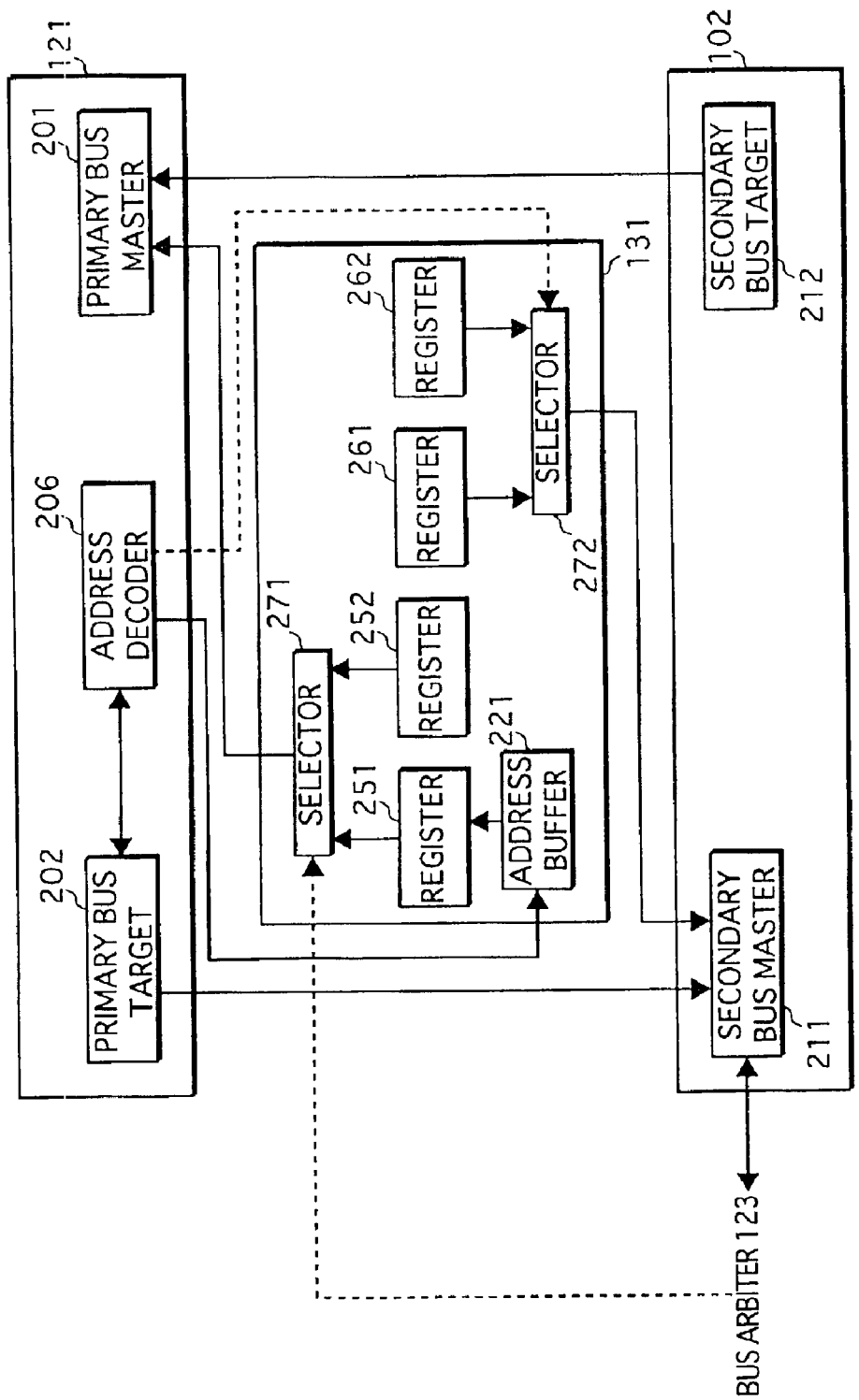
FIG. 19 is a block diagram showing a primary bus interface and a register block shown in FIG. 18, in greater detail.

FIG. 19 is a block diagram showing the primary bus interface 121 and the register block 131 in greater detail.

As illustrated, the primary bus interface 121 includes an address decoder 206 instead of the address decoder 203.

Also, the register block 131 includes the address buffer 221, registers 251, 252, 261, and 262, and selectors 271 and 272. The registers 251, 252, 261, and 262 are each associated with a different device connected to the secondary bus. The selectors 271 and 272 each select a register output.

The registers 251, 252, 261, and 262 each hold data (relay information) which is driven during a write cycle for the register that is initiated by an initiator of the primary or secondary bus. The registers 251 and 252 are connected to the selector 271, and output stored data to the selector 271. The registers 261 and 262 are connected to the selector 272, and output stored data to the selector 272.

The selector 271 is connected to the registers 251 and 252 and the primary bus master 201. The selector 271 selects an output of one of the registers 251 and 252 according to a control signal output from the bus arbiter 123, and passes the selected output to the primary bus master 201.

The selector 272 is connected to the registers 261 and 262 and the secondary bus master 211. The selector 272 selects an output of one of the registers 261 and 262 according to a control signal output from the address decoder 206, and passes the selected output to the secondary bus master 211.

The address decoder 206 outputs a control signal to the selector 272. In so doing, the address decoder 206 controls relay information which is output to the secondary bus master 211, in accordance with an address (an address of a target of the secondary bus) driven during a read cycle on the primary bus.

The bus arbiter 123 outputs a control signal to the selector 271. In so doing, the bus arbiter 123 controls relay information which is output to the primary bus master 201, in accordance with an initiator that currently has ownership of the secondary bus.

The register 251 is given address 80000004, the register 252 is given address 80000008, the register 261 is given address 8000000C, and the register 262 is given address 80000010.

(Operations of the Bus Bridge 120)

The bus bridge 120 with the above construction operates as follows.

(Data Relay Operation in the Bus Bridge 120)

Figure 20:
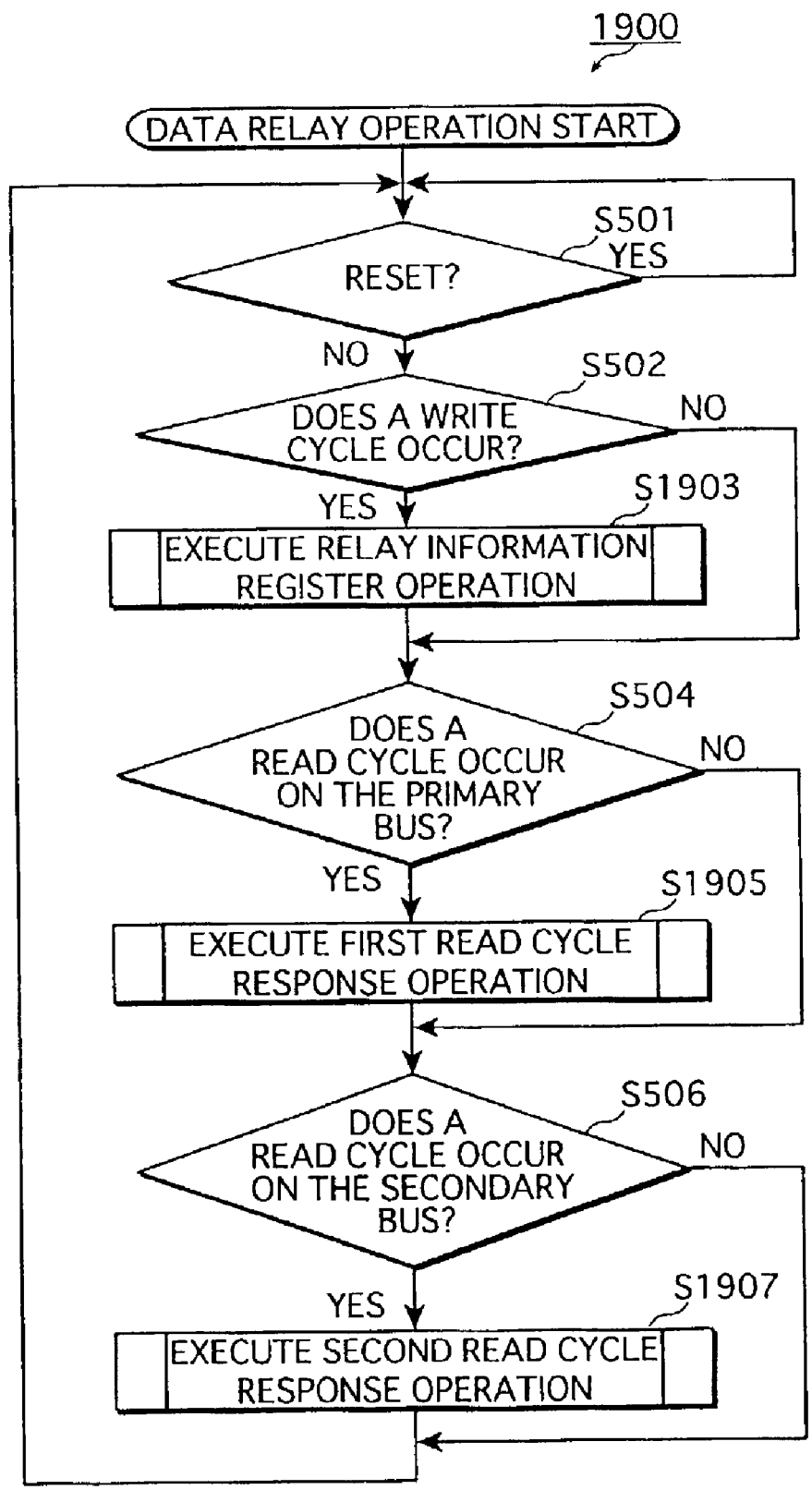
FIG. 20 is a flowchart of a data relay operation in the bus bridge shown in FIG. 18.

FIG. 20 is a flowchart of a data relay operation in the bus bridge 120.

This data relay operation differs from that of the first embodiment in the relay information register operation (S1903 instead of S503), first read cycle response operation (S1905 instead of S505), and second read cycle response operation (S1907 instead of S507).

The relay information register operation of step S1903 differs from step S503 in the contents of step S602. In detail, in the case of a write cycle for the register 261, data (relay information) driven during the write cycle is registered to the register 261. On the other hand, in the case of a write cycle for the register 262, data (relay information) driven during the write cycle is registered to the register 262.

(First Read Cycle Response Operation)

Figure 21:
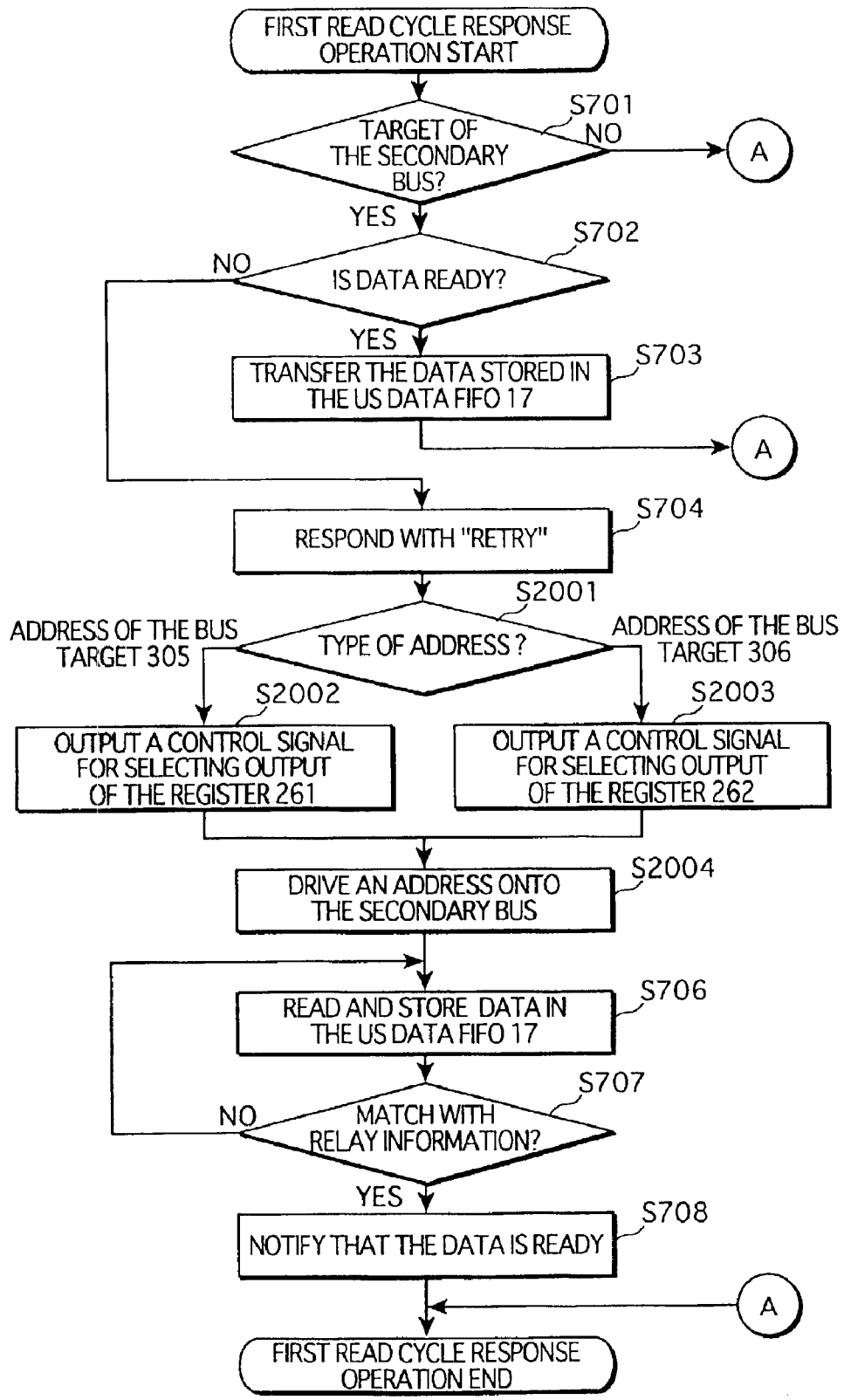
FIG. 21 is a flowchart of a first read cycle response operation in the bus bridge.

FIG. 21 is a flowchart of a first read cycle response operation in the bus bridge 120.

As shown in the drawing, this first read cycle response operation differs from that in the first embodiment in that steps S2001–S2004 are performed instead of step S705.

The address decoder 206 executes the following steps, according to an address driven during a read cycle (S2001).

If the address driven during the read cycle is an address of the bus target 305, the address decoder 206 outputs a control signal for selecting an output of the register 261, to the selector 272 (S2002). If the address driven during the read cycle is an address of the bus target 306, the address decoder 206 outputs a control signal for selecting an output of the register 262, to the selector 272 (S2003).

The secondary bus master 211 receives relay information output from the selector 272, initiates a read cycle on the secondary bus, and drives the address stored in the DS data FIFO 16 onto the secondary bus (S2004).

(Second Read Cycle Response Operation)

Figure 22:
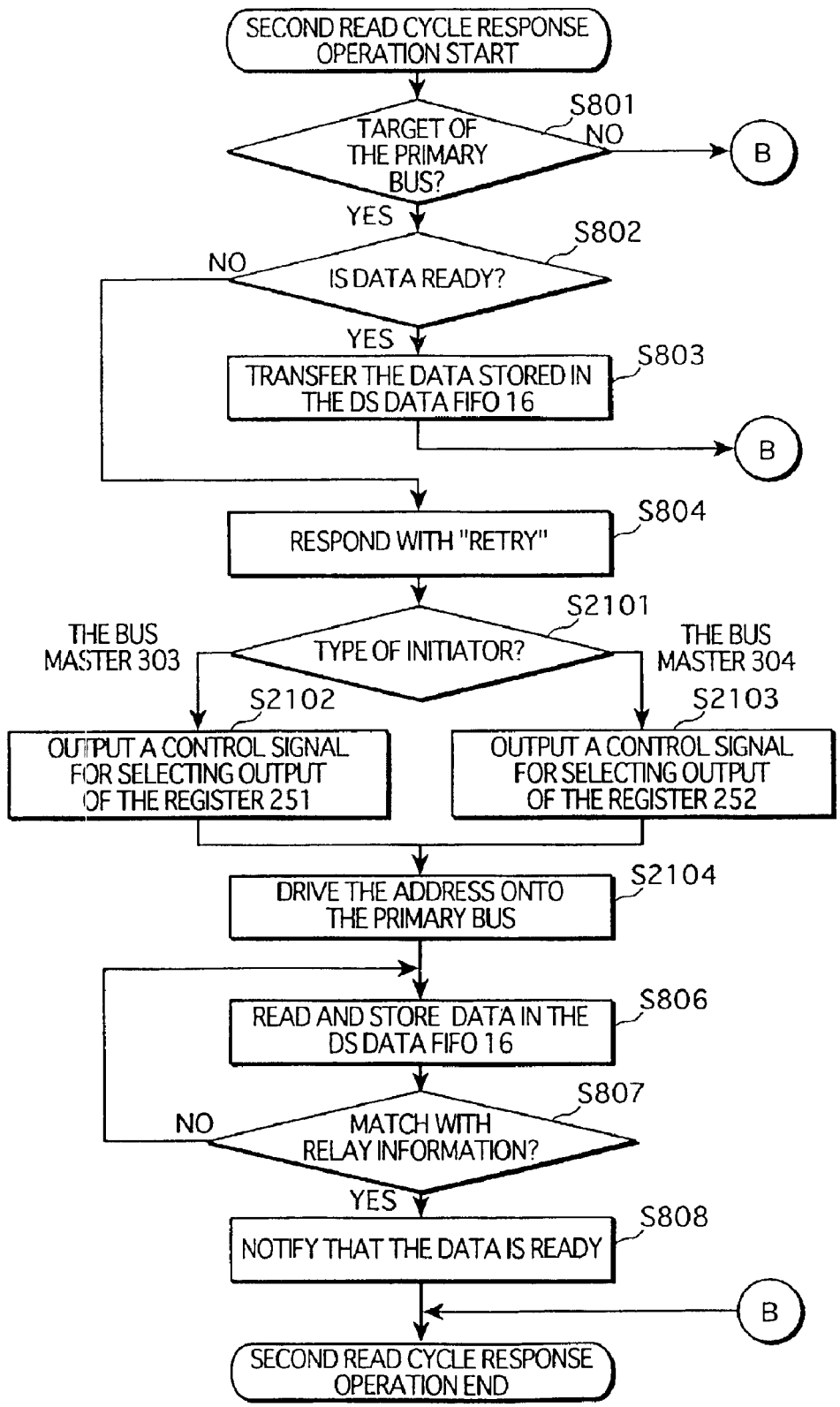
FIG. 22 is a flowchart of a second read cycle response operation in the bus bridge.

FIG. 22 is a flowchart showing a second read cycle response operation in the bus bridge 120.

This second read cycle response operation differs from the first embodiment in that steps S2101–S2104 are performed instead of step S805.

The bus arbiter 123 performs the following steps, according to which device is currently an initiator of the secondary bus (S2101).

If the initiator of the secondary bus is the bus master 303, the bus arbiter 123 outputs a control signal for selecting an output of the register 251, to the selector 271 (S2102). If the initiator of the secondary bus is the bus master 304, the bus arbiter 123 outputs a control signal for selecting an output of the register 252, to the selector 271 (S2103).

The primary bus master 201 receives relay information output from the selector 271, initiates a read cycle on the primary bus, and drives an address stored in the US data FIFO 17 onto the primary bus (S2104).

This completes an explanation on the flowcharts relating to the data relay operation of the bus bridge 120.

MODIFICATIONS

The following are example modifications to the above embodiments.

When the bus bridge is in an initial state or once data has been read from a target and a read cycle has completed, default relay information (e.g. 8 entries) may be stored to all registers in the register block.

Also, the register block in the first embodiment may have a register for each master or for each target.

Also, let T[i] be the total number of targets connected to the "i"th bus out of a plurality of buses which are connected to the bus bridge, M[i] be the total number of masters connected to the "i"th bus, and M be the total number of masters connected to the bus bridge. Then R[i], which is the number of registers corresponding to the "i"th bus, may be defined as follows:

$$R[i]=(M-M[i])\times T[i] \ (i=1, 2, \ldots)$$

Also, the bus bridge may be configured as a full custom LSI (Large Scale Integration), or a semi-custom LSI such as an ASIC (Application Specific Integrated Circuit). Furthermore, the bus bridge may be configured by a programmable device such as a FPGA (Field Programmable Gate Array) or a CPLD (Complex Programmable Logic Device), according to information obtained as a result of logic synthesis and device configuration of a program (hereafter an "HDL program") written in a hardware description language such as VHDL (Very high speed integrated circuit Hardware Description Language) or Verilog-HDL. As an alternative, the bus bridge may be configured using a netlist obtained as a result of logic synthesis of the HDL program.

Also, the HDL program or the netlist may be recorded on a computer-readable recording medium such as an optical recording medium (e.g. CD-ROM), a magnetic recording medium (e.g. hard disk), a magneto-optic recording medium (e.g. MO), or a semiconductor memory (e.g. ROM), and is downloaded to a programmable device on another computer via a download cable. Alternatively, the HDL program or the netlist may be recorded on a computer-readable recording medium such as a hard disk that is provided on general hardware of a computer which is connected to a network. This enables the HDL program or the netlist to be read to another computer through a transmission line on the network and downloaded to a programmable device via a download cable. Moreover, data obtained as a result of logic synthesis and device configuration of the HDL program may be recorded on a serial ROM and downloaded directly to an FPGA.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A bus bridge that is connected to a first bus and a second bus different from the first bus, and relays data between a first device connected to the first bus and a second device connected to the second bus, comprising:

an externally-writable memory including primary memory areas corresponding to the first and second buses;

registering means for registering relay information, showing an amount of data to be relayed from a target to a master, in a primary memory area corresponding to one of the first and second buses to which the target is connected, the target being one of the first and second devices that is a data source whereas the master being a different one of the first and second devices that is a data destination;

storing means for storing data read from the target into a temporary storage; and master functioning means corresponding to the first and second buses, wherein master functioning means corresponding to the bus to which the target is connected (a) reads data from the target while occupying the bus until an amount of data stored in the temporary storage reaches the amount shown by the relay information in the primary memory area, and (b) releases the bus once the amount of data in the temporary storage has reached the amount shown by the relay information;

wherein the relay information shows one out of (a) a number of sets of data to be relayed, each set of data having a bit length equivalent to a width of the bus, and (b) a total size of data to be relayed.

2. The bus bridge of claim 1, further comprising:

responding means for responding to a request made by the master;

wherein when the request made by the master is to write information to the primary memory area; the responding means has the registering means register the information in the primary memory area as the relay information; and when the request made by the master is to read data from the target, the responding means:

(a) judges whether the data to be relayed is stored in the temporary storage;

(b) outputs the data to the master if the data is stored in the temporary storage; and (c) advises the master to remake the request and has the master functioning means read the data from the target if the data is not stored in the temporary storage.

3. The bus bridge of claim 1, wherein the registering means registers a default value in the primary memory area as the relay information when the bus bridge is in an initial state or when the master functioning means releases the bus.

4. The bus bridge of claim 2, wherein:

the primary memory area corresponding to the bus to which the target is connected includes secondary memory areas corresponding to devices which are connected to the bus and any of which can be the target;

the registering means registers the relay information in a secondary memory area corresponding to the target; and the master functioning means reads, from the target, the data of the amount shown by the relay information in the secondary memory area.

5. The bus bridge of claim 2, wherein:

the first device and the second device are each given identification information for identifying the device;

the externally-writable memory further includes an identification information memory area;

the registering means registers identification information in the identification information memory area; and the responding means further responds to a request made by a third device which is connected to any of the first and second buse;

when the request made by the third device is to write information to the identification information memory area, the responding means has the registering means register the information in the identification information memory area as the identification information; and when the request made by the third device is to write information to a device identified by the identification information in the identification information memory area, the responding means has the registering means register the information in the primary memory area as the relay information.

6. The bus bridge of claim 2, wherein:

the first bus is connected to a central processing unit that can be the master and a storage device that can be the target, and the second bus is connected to devices any of which can be the master or the target;

the primary memory areas include:

a first primary memory area for holding relay information showing an amount of data to be read from the target connected to the first bus; and a second primary memory area for holding relay information showing an amount of data to be read from the target connected to the second bus;

the temporary storage includes:

a first storage area for storing data read from the target connected to the first bus; and a second storage area for storing data read from the target connected to the second bus;

the registering means includes:

a first selector, connected to the first primary memory area, for selecting relay information held in the first primary memory area; and a second selector, connected to the second primary memory area, for selecting relay information held in the second primary memory area;

the responding means includes:

a bus arbiter for outputting a control signal to the first selector, the control signal instructing to select relay information corresponding to the master connected to the second bus; and an address decoder for outputting a control signal to the second selector, the control signal instructing to select relay information corresponding to the target connected to the second bus; and the master functioning means include:

first master functioning means for reading data from the target connected to the first bus until data of an amount shown by the relay information selected by the first selector is stored in the first storage area; and second master functioning means for reading data from the target connected to the second bus until data of an amount shown by the relay information selected by the second selector is stored in the second storage area.

7. The bus bridge of claim 4, wherein:

the secondary memory area corresponding to the target includes tertiary memory areas corresponding to devices any of which can be the master;

the registering means registers the relay information in a tertiary memory area corresponding to the master; and the master functioning means reads, from the target, the data of the amount shown by the relay information in the tertiary memory area.

8. A data relay method used for a bus bridge to a first bus, which is connected to first devices any of which is at least one of a first master and a first target, and to a second bus, which is connected to second devices any of which is at least one of a second master and a second target, the data relay method being used to relay data between the first device connected to the first bus and the second device connected to the second bus, the data relay method comprising:

holding first relay information in a first externally-writable memory area of the bus bridge, the first relay information showing an amount of data to be relayed from the first target connected to the first bus to the second master connected to the second bus;

holding second relay information in a second externally-writable memory area of the bus bridge, the second relay information showing an amount of data to be relayed from the second target connected to the second bus to the first master connected to the first bus;

sending, from the second master to the bus bridge, a request to read from the first target wherein:

if the data to be relayed is stored in the bus bridge, sending the data from the bus bridge to the second master; and if the data to be relayed is not stored in the bus bridge, reading data from the first target to the bus bridge while occupying the first bus to which the first target is connected until an amount of data stored in the bus bridge reaches the amount shown by the first relay information, and releasing the first bus once the amount of data stored in the first bus bridge has reached the amount shown by the first relay information; and sending, from the first master to the bus bridge, a request to read from the second target, wherein:

if the data to be relayed is stored in the bus bridge, sending the data from the bus bridge to the first master; and if the data to be relayed is not stored in the bus bridge, reading data from the second target to the bus bridge while occupying the second bus to which the second target is connected until an amount of data stored in the bus bridge reaches the amount shown by the second relay information, and releasing the second bus once the amount of data stored in the second bus bridge has reached the amount shown by the second relay information.

9. A bus bridge for connection to a first bus and a second bus different from the first bus, and for relaying data between a first device connected to the first bus and a second device connected to the second bus, the bus bridge comprising:

an externally-writable memory including primary memory areas corresponding to the first and second buses;

a register for registering relay information, showing an amount of data to be relayed from a target to a master, in a primary memory area corresponding to one of the first and second buses to which the target is connected, the target being one of the first and second devices that is a data source and the master being a different one of the first and second devices that is a data destination;

a storing unit for storing data read from the target into a temporary storage; and master functioning units corresponding to the first and second buses, wherein the master functioning unit corresponding to the bus to which the target is connected (a) reads data from the target while occupying the bus until an amount of data stored in the temporary storage reaches the amount shown by the relay information in the primary memory area, and (b) releases the bus once the amount of data in the temporary storage has reached the amount shown by the relay information;

wherein the relay information shows one of (a) a number of sets of data to be relayed, each set of data having a bit length equivalent to a width of the bus, and (b) a total size of data to be relayed.

10. A bus bridge for connection to a first bus, which is connected to first devices any of which is at least one of a first master and a first target, and to a second bus, which is connected to second devices any of which is at least one of a second master and a second target, and for relaying data between the first device and the second device, the bus bridge comprising:

a first externally-writable memory area for holding first relay information showing an amount of data to be relayed from the first target connected to the first bus to the second master connected to the second bus;

a second externally-writable memory area for holding second relay information showing an amount of data to be relayed from the second target connected to the second bus to the first master connected to the first bus;

a temporary storage for temporarily storing data read from the first target and the second target;

a bus arbiter for selecting the second master among the second devices connected to the second bus and outputting a signal showing which of the second devices is the second master;

an address decoder for decoding an address of the second device and outputting a signal showing the decoded address;

a first master functioning unit for reading a first amount of data from the first target and storing the first amount of data in the temporary storage, the first amount of data being determined based on the first relay information and the signal outputted by the bus arbiter; and a second master functioning unit for reading a second amount of data from the second target and storing the second amount of data in the temporary storage, the second amount of data being determined based on the second relay information.

11. The bus bridge of claim 10, further comprising:

a responding unit for responding to a request made by the second master, wherein when the request made by the second master is to relay data from the first target, the responding unit (a) judges whether the data to be relayed is stored in the temporary storage, (b) outputs the data to the second master if the data is stored in the temporary storage, and (c) advises the second master to repeat the request and causes the first master functioning unit to read the data from the first target, if the data is not stored in the temporary storage.

12. The bus bridge of claim 10, further comprising:

a first selector connected to the first externally-writable memory area for selecting the first amount of data based on the first relay information and the signal outputted by the bus arbiter;

wherein the first master functioning unit reads the data from the first target until the first amount of data is stored in the temporary storage.

13. The bus bridge of claim 10, further comprising:

a second selector connected to the second externally-writable memory area for selecting the second amount of data based on the second relay information and the signal outputted by the address decoder;

wherein the second master functioning unit reads the data from the second target until the second amount of data is stored in the temporary storage.

14. The bus bridge of claim 10, wherein at least one of the first and the second relay information relates to one of (a) a number of sets of data to be relayed, each set of data having a bit length equivalent to a width of the bus, and (b) a total size of data to be relayed.

15. Bus bridge circuit information for configuring a programmable logic device as a bus bridge for connection to a first bus, which is connected to first devices any of which is at least one of a first master and a first target, and to a second bus, which is connected to second devices any of which is at least one of a second master and a second target, and for relaying data between the first device and the second device, the bus bridge circuit information comprising:

circuit information for configuring the programmable logic device as the bus bridge that includes:

a first externally-writable memory area for holding first relay information showing an amount of data to be relayed from the first target connected to the first bus to the second master connected to the second bus;

a second externally-writable memory area for holding second relay information showing an amount of data to be relayed from the second target connected to the second bus to the first master connected to the first bus;

a temporary storage for temporarily storing data read from the first target and the second target;

a bus arbiter for selecting the second master among the second devices connected to the second bus and outputting a signal showing which of the second devices is the second master;

an address decoder for decoding an address of the second device and outputting a signal showing the decoded address;

a first master functioning unit for reading a first amount of data from the first target and storing the first amount of data in the temporary storage, the first amount of data being determined based on the first relay information and the signal outputted by the bus arbiter; and a second master functioning unit for reading a second amount of data from the second target and storing the second amount of data in the temporary storage, the second amount of data being determined based on the second relay information.

16. The bus bridge circuit information of claim 15, wherein the circuit information configures the programmable logic device as the bus bridge to further include:

a responding unit for responding to a request made by the second master, wherein when the request made by the second master is to relay data from the first target, the responding unit (a) judges whether the data to be relayed is stored in the temporary storage, (b) outputs the data to the second master if the data is stored in the temporary storage, and (c) advises the second master to repeat the request and causes the first master functioning unit to read the data from the first target, if the data is not stored in the temporary storage.

17. A programmable logic device readable recording medium that stores bridge circuit information for configuring a programmable logic device as a bus bridge for connection to a first bus, which is connected to first devices any of which is at least one of a first master and a first target, and to a second bus, which is connected to second devices any of which is at least one of a second master and a second target, and for relaying data between the first device and the second device, the programmable logic device readable recording medium comprising:

circuit information for configuring the programmable logic device as the bus bridge that includes:

a first externally-writable memory area for holding first relay information showing an amount of data to be relayed from the first target connected to the first bus to the second master connected to the second bus;

a second externally-writable memory area for holding second relay information showing an amount of data to be relayed from the second target connected to the second bus to the first master connected to the first bus;

a temporary storage for temporarily storing data read from the first target and the second target;

a bus arbiter for selecting the second master among the second devices connected to the second bus and outputting a signal showing which of the second devices is the second master;

an address decoder for decoding an address of the second device and outputting a signal showing the decoded address;

a first master functioning unit for reading a first amount of data from the first target and storing the first amount of data in the temporary storage, the first amount of data being determined based on the first relay information and the signal outputted by the bus arbiter; and a second master functioning unit for reading a second amount of data from the second target and storing the second amount of data in the temporary storage, the second amount of data being determined based on the second relay information.

18. The programmable logic device readable recording medium of claim 17, wherein the circuit information configures the programmable logic device as the bus bridge to further include:

a responding unit for responding to a request made by the second master, wherein when the request made by the second master is to relay data from the first target, the responding unit (a) judges whether the data to be relayed is stored in the temporary storage, (b) outputs the data to the second master if the data is stored in the temporary storage, and (c) advises the second master to repeat the request and causes the first master functioning unit to read the data from the first target, if the data is not stored in the temporary storage.

19. A data relay method for a bus bridge connected to a first bus, which is connected to first devices any of which is at least one of a first master and a first target, and to a second bus, which is connected to second devices any of which is at least one of a second master and a second target, the bus bridge being used for relaying data between the first device and the second device, the data relay method comprising:

holding first relay information in a first externally-writable memory area, the first relay information showing an amount of data to be relayed from the first target connected to the first bus to the second master connected to the second bus;

holding second relay information in a second externally-writable memory area, the second relay information showing an amount of data to be relayed from the second target connected to the second bus to the first master connected to the first bus;

temporarily storing data read from the first target and the second target;

selecting the second master among the second devices connected to the second bus and outputting a signal showing which of the second devices is the second master;

decoding an address of the second device and outputting a signal showing the decoded address;

reading a first amount of data from the first target and storing the first amount of data, the first amount of data being determined based on the first relay information and the outputted signal showing which of the second devices is the second master; and reading a second amount of data from the second target and storing the second amount of data, the second amount of data being determined based on the second relay information.

* * * * *